United States Patent
Frank

(10) Patent No.: US 12,149,388 B2
(45) Date of Patent: Nov. 19, 2024

(54) CALCULATING AN EVM OF AN ANTENNA PORT

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/250,338

(22) PCT Filed: Oct. 25, 2021

(86) PCT No.: PCT/IB2021/059840
§ 371 (c)(1),
(2) Date: Apr. 24, 2023

(87) PCT Pub. No.: WO2022/084973
PCT Pub. Date: Apr. 28, 2022

(65) Prior Publication Data
US 2023/0396470 A1 Dec. 7, 2023

Related U.S. Application Data

(60) Provisional application No. 63/105,037, filed on Oct. 23, 2020.

(51) Int. Cl.
*H04L 25/03* (2006.01)
(52) U.S. Cl.
CPC .............................. *H04L 25/03968* (2013.01)
(58) Field of Classification Search
CPC .................. H04L 25/03968; H04B 7/0413
See application file for complete search history.

(56) References Cited

U.S. PATENT DOCUMENTS

| | | | |
|---|---|---|---|
| 2012/0128038 A1* | 5/2012 | Crilly, Jr. | H04B 7/10 375/211 |
| 2016/0380682 A1* | 12/2016 | Sienkiewicz | H04B 7/0848 375/267 |
| 2020/0295843 A1* | 9/2020 | Su | H04L 25/03012 |

OTHER PUBLICATIONS

PCT/IB2021/059840, "Notification of Transmittal of the International Search Report and the Written Opinion of the International Searching Authority, or the Declaration", International Searching Authority, Jan. 28, 2022, pp. 1-10.
QUALCOMM, "WF on Enabling Transparent TxD in Rel-16", 3GPP TSG-RAN WG4 Meeting # 95-e R4-2008465, May 25-Jun. 5, 2020, pp. 1-9.

(Continued)

*Primary Examiner* — Sung S Ahn
(74) *Attorney, Agent, or Firm* — Kunzler Bean & Adamson

(57) ABSTRACT

Apparatuses, methods, and systems are disclosed for calculating an EVM of a transmitter. An apparatus includes a transceiver that receives, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. The apparatus includes a processor that determines an EVM for the antenna port of the transmitter based on an output of the unbiased linear MMSE equalizer.

20 Claims, 10 Drawing Sheets

(56) References Cited

OTHER PUBLICATIONS

Lenovo et al., "Further Considerations on the EVM Definition for Antenna Ports Including Transparent Transmit Diversity", 3GPP TSG-RAN WG4 Meeting RAN4#96-e R4-2011519, Aug. 17-28, 2020, pp. 1-9.
Lenovo et al., "On the Transmit EVM Requirement for UL MIMO Transmission", 3GPP TSG-RAN WG4 Meeting RAN4#96-e R4-2011520, Aug. 17-28, 2020, pp. 1-9.
Lenovo et al., "On the EVM Definition for Transmit Diversity", 3GPP TSG-RAN WG4 Meeting RAN4#97-e R4-2016288, Nov. 2-13, 2020, pp. 1-12.

\* cited by examiner

CALCULATING AN EVM OF AN ANTENNA PORT

CROSS-REFERENCE TO RELATED APPLICATIONS

This application claims priority to U.S. Provisional Patent Application No. 63/105,037 entitled "MEASURING AND SPECIFYING EVM FOR AN ANTENNA PORT" and filed on Oct. 23, 2020, for Colin D. Frank, which application is incorporated herein by reference.

FIELD

The subject matter disclosed herein relates generally to wireless communications and more particularly relates to configurations for transmitter Error Vector Magnitude ("EVM") definition for an antenna port.

BACKGROUND

In wireless communication devices, phase and amplitude distortion created by the power amplifier and other transmitter nonlinearities directly affect the quality of the communication. A fundamental measurement for analyzing transmitter performance in the latest communication system protocols is Error Vector Magnitude ("EVM"). This is a measure of modulation accuracy, or the quality of the transmitted waveform, represented by the varying phase and amplitude of an RF signal. EVM measurements lend insight into the communication link and are a key measure of transmitter performance.

However, due to signal leakage between the signal paths and coupling between the antennas within the UE, it seems that it is not possible to measure the EVM for the antenna connectors independently. If the EVM is measured without addressing the signal leakage between the signaling and coupling between the two antennas, the EVM requirement cannot be met.

BRIEF SUMMARY

Disclosed are procedures for calculating an EVM of a transmitter. Said procedures may be implemented by apparatus, systems, methods, or computer program products.

In one embodiment, a first apparatus includes a transceiver that receives, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the first apparatus includes a processor that determines an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, a first method includes receiving, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the first method includes determining an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, a first system includes a transmitting device that generates a transmission signal and transmits the transmission via a propagation channel using a transmitter, the transmitter comprising an antenna port comprising a plurality of antennas (N) and an antenna connector for each of the plurality of antennas. In one embodiment, the first system includes an evaluation device that receives, using an unbiased linear minimum mean square error ("MMSE") equalizer, the transmission signal and calculates an error vector magnitude ("EVM") for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix with dimension N×N and is given by $\Sigma' = \langle n'^H n' \rangle$.

In one embodiment, a second method includes generating a transmission signal and transmitting the transmission via a propagation channel using a transmitter, the transmitter comprising an antenna port comprising a plurality of antennas (N) and an antenna connector for each of the plurality of antennas. In one embodiment, the second method includes receiving, using an unbiased linear minimum mean square error ("MMSE") equalizer, the transmission signal and calculating an error vector magnitude ("EVM") for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix with dimension N×N and is given by $\Sigma' = \langle n'^H n' \rangle$.F

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
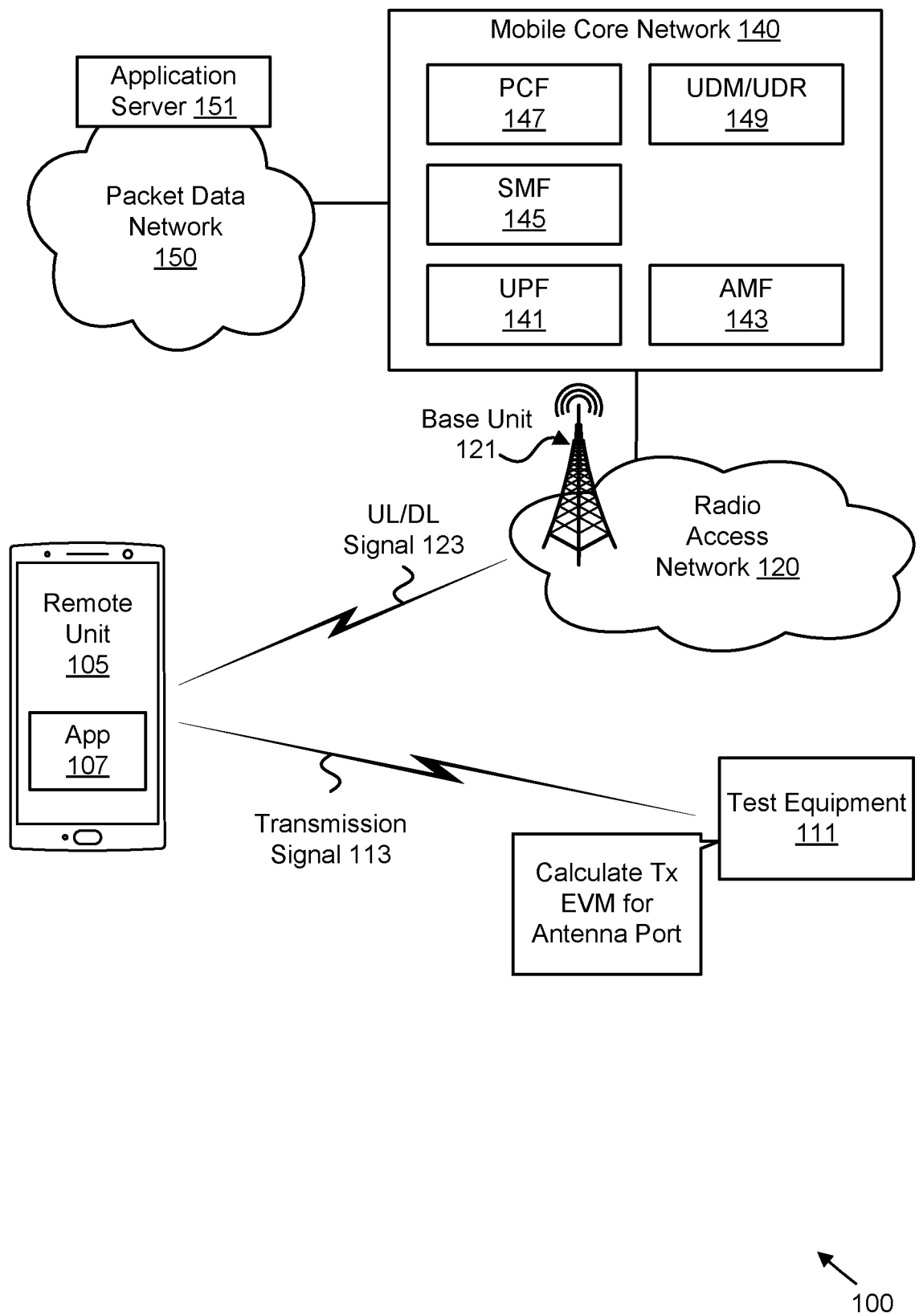
FIG. 1 is a schematic block diagram illustrating one embodiment of a wireless communication system for calculating an EVM of a transmitter.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for mechanisms for calculating an error vector magnitude ("EVM") of a transmitter. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

The problem that is addressed herein is how to define EVM for an antenna port comprised of multiple antennas. Aspects that are considered herein are (i) the case that the test equipment is not capable of measuring the covariance of the transmitter noise at the two antenna ports, and alternatively, (ii) the number of transmit and receive antennas is greater than two and the cross-correlation of the transmitter noise is either zero or unknown.

In one embodiment, the purpose of the transmitter EVM requirement is to put a lower bound on the link signal-to-noise ratio that is achievable for the radio link in the absence of any receiver impairments (e.g., thermal noise, channel estimation error, and/or the like). For single antenna transmission, in one embodiment, EVM is defined in terms of the signal-to-noise ratio of the signal constellation at the antenna connector and this makes sense since an ideal receiver can simply invert the channel and restore the signal to same state as at the transmitter.

In one embodiment, in order to define EVM an antenna port comprised of multiple physical antennas, and correspondingly, multiple antenna ports, it is first necessary to determine the link signal-to-noise ratio. However, in one embodiment, in order to determine the link signal-to-noise ratio, it is necessary to make assumptions about both the number of receive antennas and the type of receiver that is used. In one embodiment, the relationship between the proposed EVM definition and the resulting noise floor at the gNB receiver is not clear and has not been provided. Since the purpose of the EVM requirement is to set a lower bound on the link performance due to transmitter impairments, this relationship must be understood. Once the received signal-to-noise ratio has been determined for the ideal receiver, in one embodiment, for multi-antenna transmission, the EVM at the output of this receiver is given by:

$$EVM = 100 \cdot \sqrt{\frac{1}{SNR}}.$$

where SNR is measured at the output of an ideal (noiseless) receiver.

For single antenna transmission and reception, in one embodiment, the EVM at the transmit antenna connector and the EVM at the output of the single antenna gNB receiver are the same since the gNB receiver can simply invert the channel. However, the relationship between the EVM at the UE antenna connectors and the noise floor at the gNB receiver, in one embodiment, must be evaluated for an antenna port comprised of multiple transmit antennas.

In one embodiment, if the transmitter port is comprised of two physical antennas and the receiver has only a single physical antenna, the channel can be such that the two transmitted signals cancel each other at the location of the receive antenna so that the received signal-to-noise ratio can be zero (negative infinity in dB). As a result, in one embodiment, for the single antenna reception of a multi-antenna transmission (where the same signal is transmitted from both antennas except for complex weighting), there is no signal quality measure at the transmitter that can guarantee a link signal-to-noise greater than any target threshold greater than negative infinity. Furthermore, in the case that the signals do not completely cancel, in one embodiment, the received signal to noise ratio will still be a function of the channel, and there is no transmitter requirement that can be defined which will remove the dependence of the received signal-to-noise ratio on the channel.

In further embodiments, the signal-to-noise ratio at the output of the gNB receiver can be analyzed for an antenna port comprised of two antennas for the case that the gNB receiver has two antennas and employs an unbiased linear MMSE receiver. Based on this analysis, in one embodiment, a definition for EVM for an antenna port comprised of multiple antennas which depends on the cross-correlation of the transmitter noise for the two antennas can be determined. As described herein, the definition is modified for the case that the correlation coefficient of the transmitter noise is either bounded or entirely unknown.

In one embodiment, a first solution for measuring the EVM of a transmitter is for the case where that the correlation coefficient is not known but is bounded by $\rho_{max}$, so that $0 \leq \rho < \rho_{max}$, the port EVM can be bounded by $$EVM_{port,wc}(\rho_{max}) = \begin{cases} \min(EVM_1, EVM_2)\sqrt{\dfrac{1-\rho_{max}^2}{1+\beta^2-2\rho_{max}\beta}} & \rho_{max} \leq \beta \\ \min(EVM_1, EVM_2) & \rho_{max} > \beta \end{cases}$$

where $$\rho = \frac{|E(n_1' n_2'^*)|}{\sqrt{E(|n_1'|^2)(|n_1'|^2)}} = \frac{|E(n_1' n_2'^*)|}{EVM_1 EVM_2},$$

$$\beta = \frac{\min(EVM_1, EVM_2)}{\max(EVM_1, EVM_2)}$$

and $$\sqrt{\frac{1-\rho_{max}^2}{1+\beta^2-2\rho_{max}\beta}} \leq 1.$$

Another embodiment is directed to the case where if the number of transmit antennas is equal to two and if the correlation matrix $\Sigma$ of the transmitter noise is not known, then $$EVM_{port} = \min(EVM_1, EVM_2).$$

Yet another embodiment is directed to the case where if the transmitter noise n at the N antenna connectors is observed to be independent so that the observed covariance matrix $\Sigma = \langle n^H n \rangle$ is diagonal, then the port EVM is given as $$EVM_{port} = \left( \frac{\sum_{i=1}^{N} \prod_{j=1, j \neq i}^{N} EVM_j^2}{\sum_{i=1}^{N} EVM_i^2} \right)^{\frac{1}{2}}$$

Furthermore, in one embodiment, it may be beneficial to set per antenna EVM requirements equal to $EVM_{req}/\sqrt{N}$ for where $EVM_{req}$ is the single antenna EVM requirement for the given modulation since if the per antenna EVM's are less than this value, then $EVM_{port}$ will be less than $EVM_{req}$. This also protects against transmitting a small amount of power with very low EVM over one antenna to artificially push the $EVM_{port}$ low since $EVM_{port}$ is always less than the minimum of the EVM values over all N antenna connectors.

If the transmitter noise is correlated so that $\Sigma$ is not diagonal, the port EVM can be expressed as $$EVM_{port} = 100 \cdot (1_{1 \times N} \Sigma'^{-1} 1_{N \times 1})^{-\frac{1}{2}}$$

where $\Sigma'$ has dimension N×N and is given by $\Sigma' = \langle n'^H n' \rangle$.

If the covariance of the transmitter noise at the N antenna connectors is unknown, then the port EVM can be computed as $$EVM_{port} = \min(EVM_1, EVM_2, \ldots, EVM_N).$$

FIG. 1 depicts a wireless communication system 100 for calculating an EVM of a transmitter, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for calculating an EVM of a transmitter apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems calculating an EVM of a transmitter (e.g., UE transmitter or gNB transmitter).

As described above, EVM is a measure of modulation accuracy, or in the quality of the waveform transmitted by the remote unit 105, represented by the varying phase and amplitude of an RF signal. As such, the remote unit 105 may send a transmission signal 113 to a test equipment 111. Upon receiving the transmission signal 113, the test equipment 111 calculates a transmitter EVM for an antenna port. Note that in other embodiments, the remote unit 105 may transmit to the base unit 121, where the base unit 121 calculates a transmitter EVM for an antenna port.

Figure 2:
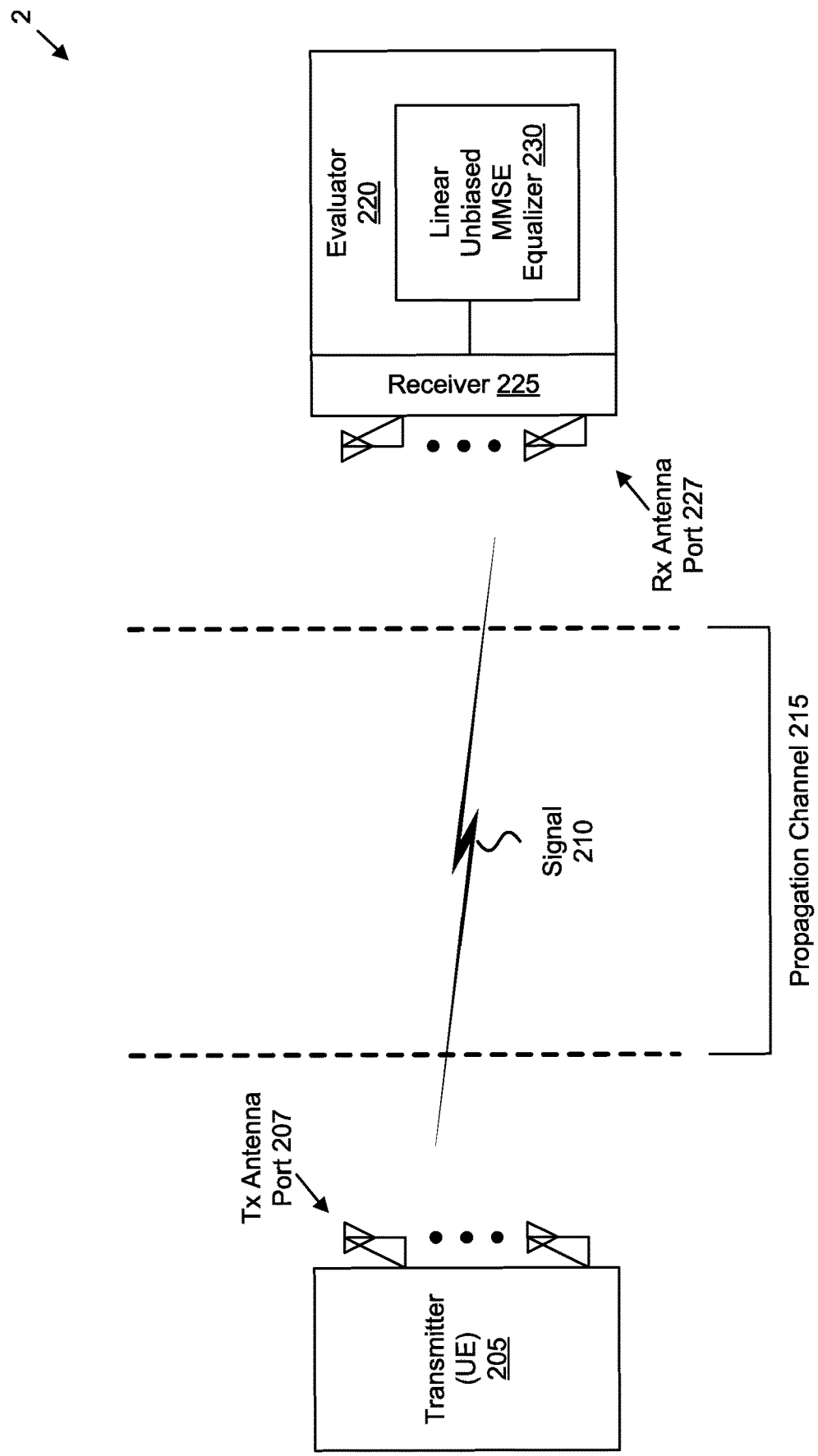
FIG. 2 is a block diagram illustrating one embodiment of a communication arrangement for calculating an EVM of a transmitter.

FIG. 2 is a block diagram illustrating one embodiment of a communication arrangement 200 for calculating a transmitter EVM of an antenna port and/or single-layer MIMO transmission. The arrangement 200 involves a transmitter 205 and an evaluator 220 for calculating an EVM of the transmitter 205. As depicted, the transmitter comprises a plurality of antennas. In some embodiments, the plurality of transmitter antennas ("Tx antennas") are arranged into one or more antenna ports 207 (i.e., Tx antenna ports), each antenna port 207 comprising multiple antennas and with an antenna connector for each antenna. In certain embodiments, the transmitter 205 is one embodiment of the remote unit 105 and the evaluator 220 is an embodiment of the test equipment 111 or the base unit 121. However, in other embodiments the transmitter may be an embodiment of the base unit 121, wherein the evaluator 220 is an embodiment of the test equipment 111 or another base unit 121.

The transmitter 205 generates a transmission signal 210 and transmits the signal 210 to the evaluator 220 via a propagation channel 215. The evaluator 220 measures the signal 210 using an unbiased linear MMSE equalizer 230 and calculates an EVM of the transmitter antenna port, according to the below descriptions. Note that the receiver 225 of the evaluator 220 may comprise a plurality of antennas. In some embodiments, the plurality of receiver antennas ("Rx antennas") are arranged into one or more antenna ports 227 (i.e., Rx antenna ports), each antenna port 227 comprising multiple antennas and with an antenna connector for each antenna. Importantly, the transmission signal 210 is received by the receiver 225 using the same number of antennas as used by the transmitter 205. For example, the Rx antenna port 227 may comprise the same number of antennas as comprises the Tx antenna port 207.

In one embodiment, for the single antenna reception of a multi-antenna transmission, there is no transmit signal quality measure at the transmitter 205 that can guarantee a received signal-to-noise greater than any target threshold greater than zero in linear terms. Furthermore, even for an ideal receiver, the received signal-to-noise ratio will always depend on the channel between the transmitter 205 and the receiver 225.

In such an embodiment, when determining the lower bound on the achievable link signal-to-noise ratio for the transmitter port comprised of two physical antennas and two physical antenna connectors, it must be assumed that the receiver 225 is comprised of at least two physical antennas.

In order to evaluate the signal-to-noise ratio at the receiver, the receiver algorithm must also be defined. For a single layer transmission, at least two receivers 225 can be considered when evaluating the signal-to-noise ratio that is subsequently used to determine the transmitter EVM. At least three receivers 225 can be considered for evaluating the signal-to-noise ratio and these are:

The normalized conjugate-gain combiner;
The linear minimum mean-square error ("MMSE") receiver; and
The linear unbiased minimum mean-square error (unbiased MMSE) receiver.

In one embodiment, the normalized conjugate-gain combiner is unbiased but is sub-optimal in the case that the transmitter noise at has unequal variance and/or is correlated. The second receiver, the MMSE receiver, in one embodiment, is biased so that the expected value of its output conditioned on the data symbol is not equal to the data symbol. Due to this bias, the mean-square error is not measured correctly, and the signal-to-noise ratio does not correctly map to link performance. The third receiver, the linear unbiased MMSE receiver, in one embodiment, is optimal in the sense that it maximizes the received signal-to-noise ratio over the set of all linear unbiased receivers.

Figure 3:
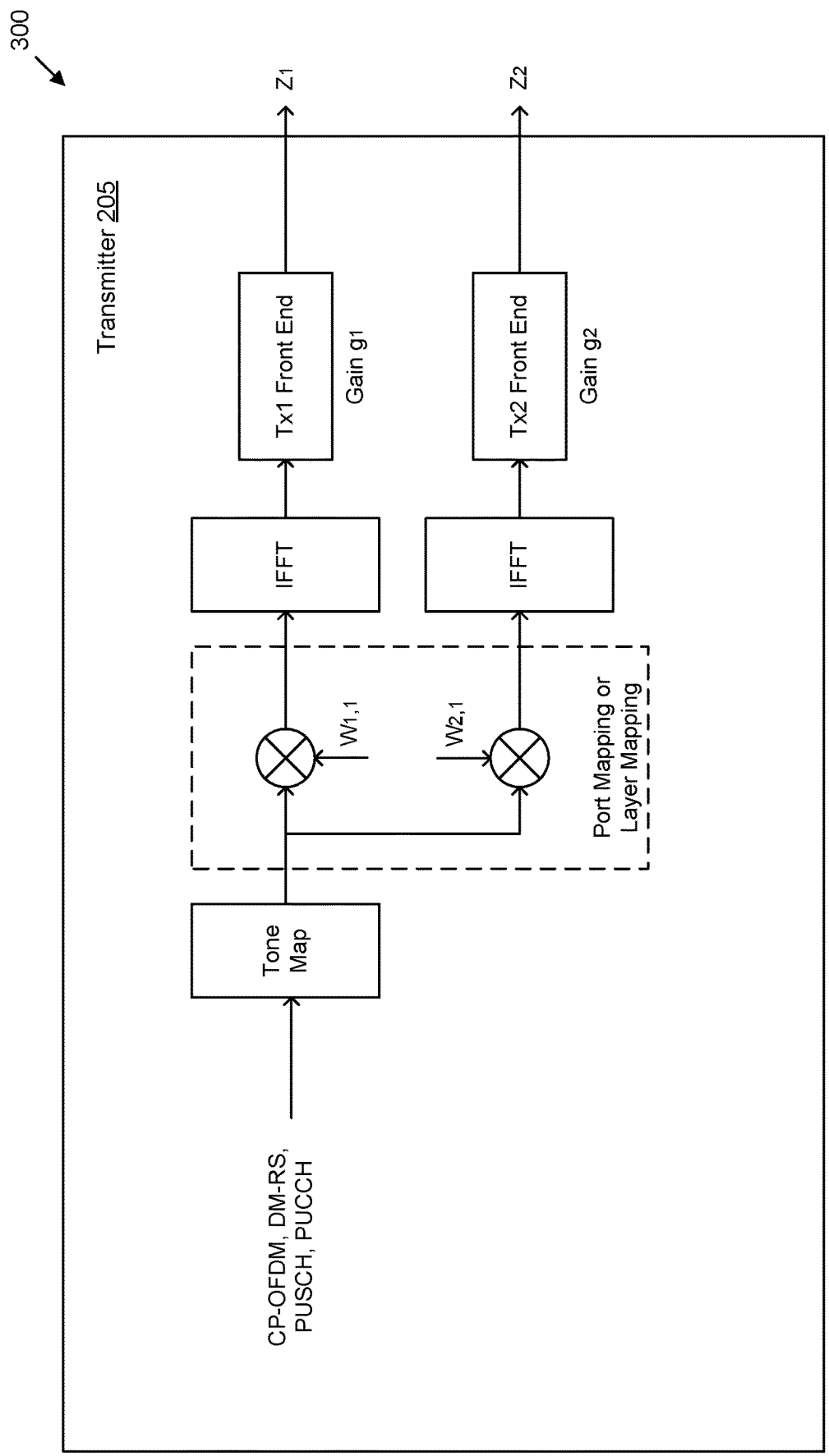
FIG. 3 is a block diagram illustrating one embodiment of a transmitter for an antenna port with two antennas.

FIG. 3 depicts one example of a UE implementation 300 of a transmitter 205 of an antenna port corresponding to two physical antennas. With this implementation, in one embodiment, the same complex-valued antenna weights can be applied to all subcarriers, or alternatively, different complex-valued antenna weights can be applied to each subcarrier or to each RB. In the case of single layer MIMO, in one embodiment, the same complex valued weights are used for a set of consecutive RB's. Alternatively, in the case of small delay cyclic diversity, in one embodiment, the phase of the complex weight on the second antenna varies linearly with frequency.

Fundamentally, in one embodiment, the EVM that will be observed at the gNB receiver for each subcarrier depends on the number of receive antennas at the gNB and the type of receiver that is used. While the single antenna receiver has previously been considered, in one embodiment, it will not be considered further here because it is not possible to define EVM for the UE transmitter in a way that limits the noise floor at the output of the single antenna gNB receiver. The reason for this, in one embodiment, is that the signals transmitted from the two antennas can cancel in the channel while the transmitter noise received from the two antennas add in power if uncorrelated.

In one embodiment, if the transmitter noise n at the two antenna connectors is observed to be independent so that the observed covariance matrix $\Sigma = \langle n^H n \rangle$ is diagonal, then the port EVM is given as: )

$$EVM_{port} = \sqrt{\frac{EVM_1^2 EVM_2^2}{EVM_1^2 + EVM_2^2}}$$

where $EVM_1$ and $EVM_2$ are the EVM values for the first and second antenna connectors. If the transmitter noise is correlated so that $\Sigma$ is not diagonal, then the EVM for the port or layer can be computed either as:

$$EVM_{port} = 100 \cdot \sqrt{(w^H \Sigma^{-1} w)^{-1}}$$

or equivalently, as:

$$EVM_{port} = 100 \cdot \left( \begin{bmatrix} 1 \\ 1 \end{bmatrix}^H \Sigma'^{-1} \begin{bmatrix} 1 \\ 1 \end{bmatrix} \right)^{-\frac{1}{2}}$$

where w, $\Sigma$, and $\Sigma'$ are defined above.

In one embodiment, the subject matter disclosed herein considers the case in which the number of gNB receive antennas is equal to the number of UE antennas used to transmit (with non-zero power) the signal corresponding to the antenna port. For a single layer transmission, in one embodiment, the frequency-domain signal at the transmitter antenna connectors is given by:

$$z = w\,x + n,$$

where x is the data symbol, n is the transmitter noise at the two antenna connectors given by given by $n = [n_1\ n_2]^T$. Here w is a 2×1 vector given by $$\begin{bmatrix} w_1 \\ w_2 \end{bmatrix} = \begin{bmatrix} g_1 w_1' \\ g_2 w_2' \end{bmatrix}$$

where w' is the 2×1 rank 1 precoder applied at baseband, and $g_1$ and $g_2$ are the complex gains of the transmitter front ends for the first and second antennas.

It follows that:

$$\Sigma = E(n^H n)$$

$$n' = \begin{bmatrix} n_1' \\ n_2' \end{bmatrix} = \begin{bmatrix} \hat{w}_1^{-1} n_1 \\ \hat{w}_2^{-1} n_2 \end{bmatrix}$$

$$\Sigma' = \langle n'^H n' \rangle$$

For the case of two receive antennas, the frequency-domain signal received by the gNB is given by:

$$y = H\,z = H(w\,x + n),$$

where H is the 2×2 channel matrix between the UE transmitter and the gNB receiver. In one embodiment, the noise variance at the output of an unbiased linear MMSE receiver is considered. In general, the MMSE receiver is biased in that the expected value of the output is not equal to the true value. However, in one embodiment, in order to correctly measure the EVM, the estimate of the received symbol must be unbiased so that the expected value of $\hat{x}$ is equal to x.

In one embodiment, the unbiased linear MMSE estimate for x is given by:

$$\hat{x}_{MMSE,U} = A_{MMSE,U} Y$$

where $$A_{MMSE,U} = \frac{w^H H^H (Hww^H H^H + H\Sigma H^H)^{-1}}{w^H H^H (Hww^H H^H + H\Sigma H^H)^{-1} Hw}$$

and $\Sigma = E(n\, n^H)$. The estimate is unbiased so that $$E[\hat{x}_{MMSE,U}|x] = x.$$

The noise at the output of the receiver is given by $$v_{MMSE,U} = \frac{w^H H^H (Hww^H H^H + H\Sigma H^H)^{-1} H}{w^H H^H (Hww^H H^H + H\Sigma H^H)^{-1} Hw} n.$$

In one embodiment, the noise variance can be simplified further as $$E(|v_{MMSE,U}|^2) = w^H \Sigma^{-1} w)^{-1}. \quad (1)$$

The port EVM at the output of the linear unbiased MMSE receiver is then given by:

$$EVM_{port} = 100 \sqrt{E(|v_{MMSE,U}|^2)}.$$

From expression (1) above, in one embodiment, it is apparent that the port EVM definition is independent of the channel H between the UE transmitter and the gNB receiver. So even though this EVM definition depends on the number of receive antennas and the type of receiver used by the gNB, the EVM definition does not depend on the channel H between the UE transmitter and the gNB receiver as long as the channel H is invertible.

Figure 4:
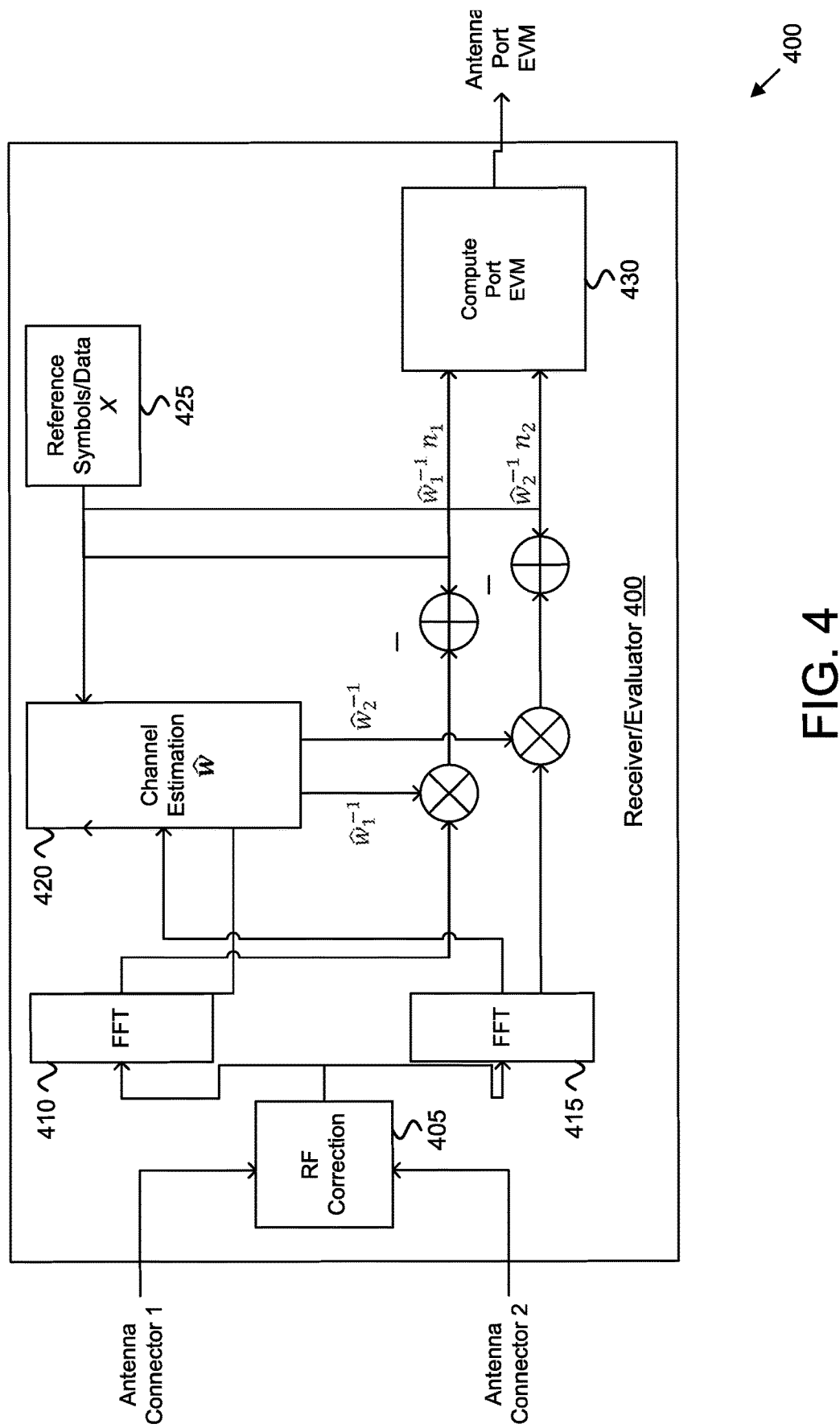
FIG. 4 is a block diagram illustrating one embodiment of a receiver used for EVM measurement for an antenna port with two antennas.

FIG. 4 depicts a high-level block diagram of the MIMO receiver and evaluator ("receiver/evaluator") 400 used for EVM measurement. The receiver/evaluator 400 may be implemented by a base unit 121, such as a gNB or another RAN node, or it may be implemented by test equipment 111. The receiver/evaluator 400, in one embodiment, is coupled to two antennas, with an antenna connector for each antenna (antenna connector #1 and antenna connector #2). Here, the receiver/evaluator 400 receives a transmission signal (e.g., a single-layer MIMO transmission), such as that generated and transmitted by the transmitter 205, using an antenna port that comprises the two antennas (and antenna connectors #1 and #2).

In the depicted embodiment, the receiver/evaluator 400 may include a common RF correction block 405. In other embodiments, the receiver/evaluator 400 may use separate RF correction blocks for each antenna, e.g., a first RF correction block for a first antenna connector and a second RF correction block for a second antenna connector.

A first Fast Fourier Transform ("FFT") block 410 receives the output of the RF correction block 405, while a second FFT block 415 receives the output of the RF correction block 405. Both FFT blocks send their output to the channel estimation block 420. The channel estimation block 420 also receives reference symbols and/or known data from the block 425. The FFT block outputs are further mixed with the output from the channel estimation block to estimate the data symbols of the transmission signal. Using the reference symbols, the error of the symbol estimate is obtained. The equalizer block 430 computes the antenna port EVM, as described below.

As shown in FIG. 4, in the case of transparent transmit diversity (or for antenna ports in general), in one embodiment, neither w', the baseband precoder, nor w, the precoder modified by the transmitter impairment g, is known to the test equipment. However, an estimate ŵ of w can be formed by correlating the output of the FFT's with either the known reference symbols or with the data symbols x if the data is known to the test equipment. The outputs of the FFT's are then multiplied by the inverse of the estimate ŵ, after which the scaled noise n' given by $$n' = \begin{bmatrix} n'_1 \\ n'_2 \end{bmatrix} = \begin{bmatrix} \hat{w}_1^{-1} n_1 \\ \hat{w}_2^{-1} n_2 \end{bmatrix}$$

is estimated by subtracting the reference symbols or the data symbol x, if known. The values $n'_1$ and $n'_2$ are the errors that are used to measure the per antenna connector EVM's, so that $$EVM_1 = \frac{1}{\sqrt{E(|n'_1|^2)}} \text{ and } EVM_2 = \frac{1}{\sqrt{E(|n'_2|^2)}}.$$

Given estimates of n' and w, the EVM for the antenna port can be computed as $$EVM_{port} = 100 \cdot \sqrt{(w^H \Sigma^{-1} w)^{-1}}$$

where $\Sigma$ is given by $$\Sigma = \langle n\, n^H \rangle.$$

and $$n = \begin{bmatrix} w_1 n'_1 \\ w_2 n'_2 \end{bmatrix}.$$

Alternatively, the EVM can be calculated as $$EVM_{port} = 100 \cdot \left( \begin{bmatrix} 1 & 1 \end{bmatrix}^H \Sigma'^{-1} \begin{bmatrix} 1 \\ 1 \end{bmatrix} \right)^{-\frac{1}{2}}$$

where $$\Sigma' = \langle n'n'^H \rangle.$$

If the transmitter noise on the two antennas is uncorrelated so that $\Sigma'$ is diagonal, the EVM becomes $$EVM_{port} = \sqrt{\frac{EVM_1^2 EVM_2^2}{EVM_1^2 + EVM_2^2}}$$

It is interesting to consider the case in which $EVM_2$ is equal to $EVM_1$, as in this case, we have $$EVM_{port} = \frac{EVM_1}{\sqrt{2}},$$

which makes sense intuitively since the signals can be added in phase while uncorrelated noise adds in power.

In one embodiment, the proposal above addresses the EVM calculation for two cases:
- the case that the test equipment has the capability of measuring the covariance matrix $\Sigma'$ of the transmitter noise at the two antenna connectors; and
- the case that the transmitter noise at the two antenna connectors can be determined to be independent by the test equipment or in the case the transmitter noise is assumed to be independent.

However, in one embodiment, there is a third case which must be considered and that is the case that the test equipment can measure the EVM for the first and second antenna connectors but cannot determine whether or not the transmitter noise at the two antenna connectors is correlated or not or the value of the correlation. Currently, there is no means for defining the EVM in this case. In one embodiment, however, it seems certain that the test equipment will be able to measure the correlation of the transmitter noise and/or implement an unbiased linear MMSE receiver in the near future. However, in the interim, we consider the case that correlation of the transmitter noise is either bounded or unknown. If we define the correlation coefficient as:

$$\rho = \frac{|E(n_1' n_2'^*)|}{\sqrt{E(|n_1'|^2)(|n_2'|^2)}} = \frac{|E(n_1' n_2'^*)|}{EVM_1 EVM_2}$$

Because the covariance matrix for the transmitter noise is positive definite, in one embodiment, it must be that $0 \leq \rho \leq 1$.

In one embodiment, the port EVM as a function of $\rho$ is given by:

$$EVM_{port}(\rho) \leq \min(EVM_1, EVM_2)\sqrt{\frac{1-\rho^2}{1+\beta^2 - 2\rho\beta}}$$

where $$\beta = \frac{\min(EVM_1, EVM_2)}{\max(EVM_1, EVM_2)}.$$

Since $$\sqrt{\frac{1-\rho^2}{1+\beta^2 - 2\rho\beta}} \leq 1,$$

it is always true for any $\rho$, $0 \leq \rho \leq 1$ that $EVM_{port} \leq \min(EVM_1, EVM_2)$.

In one embodiment, it is possible to determine the worst case EVM in the case of correlated noise over all possible covariance matrices and to use this to define EVM for the antenna port comprised of two physical antennas and two antenna connectors. In order to see how the worst case EVM can be determined in the case that the transmitter noise is correlated, let $\Sigma'$ be denoted as:

$$\Sigma' = \begin{bmatrix} \sigma_1^2 & \varepsilon \\ \varepsilon^* & \sigma_2^2 \end{bmatrix}$$

where $\varepsilon = E[(\hat{w}_1^{-1} n_1 *)\hat{w}_2^{-1} n_2]$

The inverse of $\Sigma'$ is given by $$(\Sigma')^{-1} = \frac{\begin{pmatrix} \sigma_2^2 & -\varepsilon^* \\ -\varepsilon & \sigma_1^2 \end{pmatrix}}{\sigma_1^2 \sigma_2^2 - |\varepsilon|^2}$$

We then have $$\left(\frac{EVM_{port}}{100}\right)^2 = \left([1\ 1]^H \Sigma'^{-1} \begin{bmatrix} 1 \\ 1 \end{bmatrix}\right)^{-1} =$$

$$\left(\frac{\sigma_1^2 + \sigma_2^2 - 2\mathrm{Re}(\varepsilon)}{\sigma_1^2 \sigma_2^2 - |\varepsilon|^2}\right)^{-1} = \frac{\sigma_1^2 \sigma_2^2 - |\varepsilon|^2}{\sigma_1^2 + \sigma_2^2 - 2\mathrm{Re}(\varepsilon)} \leq \frac{\sigma_1^2 \sigma_2^2 - |\varepsilon|^2}{\sigma_1^2 + \sigma_2^2 - 2|\varepsilon|},$$

where the denominator is maximized for a given magnitude of $\varepsilon$ when $\varepsilon$ is real and positive. So, if we know the magnitude of E but not the phase, then we have $$\left(\frac{EVM_{port}}{100}\right)^2 \leq \frac{\sigma_1^2 \sigma_2^2 - |\varepsilon|^2}{\sigma_1^2 + \sigma_2^2 - 2|\varepsilon|},$$

From which it follows that $$EVM_{port} \leq 100 \sqrt{\frac{10^{-8} EVM_1^2 EVM_2^2 - |\varepsilon|^2}{10^{-4} EVM_1^2 + 10^{-4} EVM_2^2 - 2|\varepsilon|}}, = \qquad (1)$$

$$\sqrt{\frac{EVM_1^2 EVM_2^2 - 10^8 |\varepsilon|^2}{EVM_1^2 + EVM_2^2 - 2\ 10^4 |\varepsilon|}},$$

The value of $|\varepsilon|$ which maximizes this expression can be found by taking the derivative with respect to $|\varepsilon|$ and setting the result equal to 0, with the result that $$\frac{\partial}{\partial |\varepsilon|}\left\{\frac{\sigma_1^2 \sigma_2^2 - |\varepsilon|^2}{\sigma_1^2 + \sigma_2^2 - 2|\varepsilon|}\right\} = \frac{-2|\varepsilon|}{\sigma_1^2 + \sigma_2^2 - 2|\varepsilon|} + \frac{2(\sigma_1^2 \sigma_2^2 - |\varepsilon|^2)}{(\sigma_1^2 + \sigma_2^2 - 2|\varepsilon|)^2} =$$

$$\frac{-2|\varepsilon|(\sigma_1^2 + \sigma_2^2 - 2|\varepsilon|) + 2(\sigma_1^2 \sigma_2^2 - |\varepsilon|^2)}{(\sigma_1^2 + \sigma_2^2 - 2|\varepsilon|)^2} = 0$$

where the denominator is non-zero unless $\sigma_1^2 = \sigma_2^2$ and $|\varepsilon| = \sigma_1^2$.

Setting the numerator equal to 0, yields $$-2|\varepsilon|\sigma_1^2 - 2|\varepsilon|\sigma_2^2 + 4|\varepsilon|^2 + 2\sigma_1^2 \sigma_2^2 - 2|\varepsilon|^2 =$$

$$2(|\varepsilon|^2 - |\varepsilon|\sigma_1^2 - |\varepsilon|\sigma_2^2 + \sigma_1^2 \sigma_2^2) = 2(|\varepsilon| - \sigma_1^2)(|\varepsilon| - \sigma_2^2) = 0$$

where the zeros occur for $|\varepsilon| = \sigma_1^2$ and $|\varepsilon| = \sigma_2^2$. Now, since $|\varepsilon| \leq \sigma_1 \sigma_2$ (because the covariance matrix is positive definite) it follows that if $\max(\sigma_1^2, \sigma_2^2) = \sigma_1^2$, then $|\varepsilon| < \sigma_2^2$ and only the zero at $|\varepsilon| = \sigma_2^2$ can be achieved. Conversely, if $\max(\sigma_1^2, \sigma_2^2) = \sigma_2^2$, then $|\varepsilon|$ is strictly less than $\sigma_1^2$, and only the zero at $|\varepsilon| = \sigma_1^2$ can be achieved.

To ensure that the zero of the derivative is a maximum and not a minimum, it is necessary to evaluate the second derivate at these zeros. The second derivate is given by $$\frac{\partial^2}{\partial^2 |\varepsilon|}\left\{\frac{\sigma_1^2\sigma_2^2 - |\varepsilon|^2}{\sigma_1^2 + \sigma_2^2 - 2|\varepsilon|}\right\} = \frac{\partial}{\partial |\varepsilon|}\left\{\frac{2(|\varepsilon|^2 - |\varepsilon|\sigma_1^2 - |\varepsilon|\sigma_2^2 + \sigma_1^2\sigma_2^2)}{(\sigma_1^2 + \sigma_2^2 - 2|\varepsilon|)^2}\right\} =$$

$$\frac{4|\varepsilon| - 2\sigma_1^2 - 2\sigma_2^2}{(\sigma_1^2 + \sigma_2^2 - 2|\varepsilon|)^2} + \frac{8(|\varepsilon|^2 - |\varepsilon|\sigma_1^2 - |\varepsilon|\sigma_2^2 + \sigma_1^2\sigma_2^2)}{(\sigma_1^2 + \sigma_2^2 - 2|\varepsilon|)^3} =$$

$$\frac{(4|\varepsilon| - 2\sigma_1^2 - 2\sigma_2^2)(\sigma_1^2 + \sigma_2^2 - 2|\varepsilon|) + 8(|\varepsilon|^2 - |\varepsilon|\sigma_1^2 - |\varepsilon|\sigma_2^2 + \sigma_1^2\sigma_2^2)}{(\sigma_1^2 + \sigma_2^2 - 2|\varepsilon|)^3} =$$

$$\frac{4\sigma_1^2\sigma_2^2 - 2\sigma_1^4 - 2\sigma_2^4}{(\sigma_1^2 + \sigma_2^2 - 2|\varepsilon|)^3} = \frac{-2(\sigma_1^2 - \sigma_2^2)^2}{(\sigma_1^2 + \sigma_2^2 - 2|\varepsilon|)^3}$$

In the above expression, the numerator is negative for all values of $\sigma_1^2$ and $\sigma_2^2$ other than $\sigma_1^2 = \sigma_2^2$, in which case the value is 0. The denominator is always positive except in the case that $\sigma_1^2 = \sigma_2^2$ and $|\varepsilon| = \sigma_1^2$. As a result, the second derivative is zero, and the zero location of the first derivative is a maximum.

When $\max(\sigma_1^2, \sigma_2^2) = \sigma_2^2$, the maximum occurs for $|\varepsilon| = \sigma_1^2$, and $$\left(\frac{EVM_{port}}{100}\right)^2 \leq \frac{\sigma_1^2\sigma_2^2 - |\varepsilon|^2}{\sigma_1^2 + \sigma_2^2 - 2|\varepsilon|} =$$

$$\frac{\sigma_1^2\sigma_2^2 - \sigma_1^4}{\sigma_1^2 + \sigma_2^2 - 2\sigma_1^2} = \frac{\sigma_1^2(\sigma_2^2 - \sigma_1^2)}{(\sigma_2^2 - \sigma_1^2)} = \sigma_1^2 = \min(\sigma_1^2, \sigma_2^2)$$

Conversely, when $\max(\sigma_1^2, \sigma_2^2) = \sigma_1^2$, the maximum occurs for $|\varepsilon| = \sigma_2^2$, and $$\left(\frac{EVM_{port}}{100}\right)^2 \leq \frac{\sigma_1^2\sigma_2^2 - |\varepsilon|^2}{\sigma_1^2 + \sigma_2^2 - 2|\varepsilon|} =$$

$$\frac{\sigma_1^2\sigma_2^2 - \sigma_2^4}{\sigma_1^2 + \sigma_2^2 - 2\sigma_2^2} = \frac{\sigma_2^2(\sigma_1^2 - \sigma_2^2)}{(\sigma_1^2 - \sigma_2^2)} = \sigma_2^2 = \min(\sigma_1^2, \sigma_2^2)$$

So, regardless of whether $\max(\sigma_1^2, \sigma_2^2) = \sigma_1^2$ or $\max(\sigma_1^2, \sigma_2^2) = \sigma_2^2$, we have the same result that $$\left(\frac{EVM_{port}}{100}\right)^2 \leq \min(\sigma_1^2, \sigma_2^2),$$

From which it follows that $$EVM_{port} \leq 100\sqrt{\min(\sigma_1^2, \sigma_2^2)} = \min(100\sqrt{\sigma_1^2}, 100\sqrt{\sigma_1^2}) = \min(EVM_1, EVM_2)$$

and finally, $$EVM_{port} \leq \min(EVM_1, EVM_2).$$

Worst-Case EVM as a Function of Transmitter Noise Correlation

From the expression (1) above, the port EVM as a function of the correlation E is bounded by $$EVM_{port} \leq \sqrt{\frac{EVM_1^2 EVM_2^2 - 10^8|\varepsilon|^2}{EVM_1^2 + EVM_2^2 - 2\cdot 10^4|\varepsilon|}}.$$

and $|\varepsilon| \leq \sigma_1\sigma_2$. We now define $\rho$, $0 \leq \rho \leq 1$, such that $$|\varepsilon| = \rho\sigma_1\sigma_2 = \rho 10^{-4} EVM_1 EVM_2,$$

where we have again used the fact that $|\varepsilon| \leq \sigma_1\sigma_2$ because the covariance matrix is positive definite.

The port EVM can now be expressed as $$EVM_{port}(\rho) \leq \sqrt{\frac{EVM_1^2 EVM_2^2 - 10^8|\varepsilon|^2}{EVM_1^2 + EVM_2^2 - 2\cdot 10^4|\varepsilon|}} = \quad (2)$$

$$\frac{EVM_1^2 EVM_2^2 - \rho^2 EVM_1^2 EVM_2^2}{EVM_1^2 + EVM_2^2 - 2\rho EVM_1 EVM_2} =$$

$$\frac{EVM_1^2 EVM_2^2}{EVM_1^2 + EVM_2^2} \frac{1-\rho^2}{1 - \frac{2\rho EVM_1 EVM_2}{EVM_1^2 + EVM_2^2}}$$

More generally if we define $$\beta = \frac{\min(EVM_1, EVM_2)}{\max(EVM_1, EVM_2)},$$

then $0 < \beta \leq 1$, and the port EVM can be expressed as $$EVM_{port}(\rho) \leq$$

$$\sqrt{\frac{\max(EVM_1, EVM_2)^4 \beta^2}{\max(EVM_1, EVM_2)^2 (1+\beta^2)} \frac{1-\rho^2}{1 - \frac{2\rho\beta\max(EVM_1, EVM_2)^2}{\max(EVM_1, EVM_2)^2(1+\beta^2)}}} =$$

$$\min(EVM_1, EVM_2)\sqrt{\frac{1-\rho^2}{1+\beta^2 - 2\rho\beta}}.$$

For the second term, subtraction of the numerator from the denominator yields $$(1+\beta^2 - 2\rho\beta) - (1-\rho^2) = \beta^2 - 2\rho\beta + \rho^2 = (\beta - \rho)^2 \geq 0.$$

Since the numerator is less than or equal to the denominator, it follows that $$\sqrt{\frac{1-\rho^2}{1+\beta^2 - 2\rho\beta}} \leq 1.$$

and thus $$EVM_{port}(\rho) \leq \min(EVM_1, EVM_2).$$

regardless of the value of the correlation coefficient $\rho$.

In the special case that $\beta = 1$ so that $EVM_1 = EVM_2$, we have $$EVM_{port}(\rho) \leq EVM_1\sqrt{\frac{1-\rho^2}{1+\beta^2 - 2\rho\beta}} =$$

$$EVM_1\sqrt{\frac{1-\rho^2}{2-2\rho}} = EVM_1\sqrt{\frac{1+\rho}{2}}.$$

In the case that the correlation coefficient is not known but is bounded by $\rho_{max}$, we consider the worst case EVM for $\rho \leq \rho_{max}$ given by $$EVM_{port,wc}(\rho_{max}) = \max_{0 \leq \rho \leq \rho_{max}} EVM_{port}(\rho).$$

In order to find the worst case EVM, it is necessary to find the maximum $$\max_{0 \leq \rho \leq \rho_{max}} \sqrt{\frac{1-\rho^2}{1+\beta^2 - 2\rho\beta}}$$

Squaring, taking the derivative and simplifying yields $$\frac{\partial}{\partial \rho}\left\{\frac{1-\rho^2}{1+\beta^2-2\rho\beta}\right\} = \frac{(\beta-\rho)(1-\rho\beta)}{(1+\beta^2-2\rho\beta)^2}.$$

The denominator is positive for $0 \leq \rho < 1$. The numerator is equal to 0 for $\rho = \beta$, and is positive for $\rho < \beta$. Thus, we have $$EVM_{port,wc}(\rho_{max}) = \begin{cases} \min(EVM_1, EVM_2)\sqrt{\frac{1-\rho_{max}^2}{1+\beta^2-2\rho_{max}\beta}} & \rho_{max} \leq \beta \\ \min(EVM_1, EVM_2) & \rho_{max} > \beta \end{cases}$$

where, as above, $$\sqrt{\frac{1-\rho_{max}^2}{1+\beta^2-2\rho_{max}\beta}} \leq 1.$$

Accordingly, the subject matter disclosed herein presents new proposals for determining the antenna port EVM:

Proposal 1A—in one embodiment, if the transmitter noise n at the two antenna connectors is independent so that the observed covariance matrix $\Sigma = \langle n^H n \rangle$ is diagonal, then the port EVM is given as:

$$EVM_{port} = \sqrt{\frac{EVM_1^2 EVM_2^2}{EVM_1^2 + EVM_2^2}}$$

where $EVM_1$ and $EVM_2$ are the EVM values for the first and second antenna connectors. Furthermore, the per antenna EVM requirement can be set to be equal to $EVM_{req}/\sqrt{2}$, since if both $EVM_1$ and $EVM_2$ are less than this value, then $EVM_{port}$ will be less than $EVM_{req}$.

Proposal 1B—in one embodiment, if the correlation matrix $\Sigma$ can be measured and is not diagonal, then the EVM for the port or layer can be computed either as:

$$EVM_{port} = 100 \cdot \sqrt{(w^H \Sigma^{-1} w)^{-1}}$$

or equivalently, as:

$$EVM_{port} = 100 \cdot \left([1\ 1]^H \Sigma'^{-1} \begin{bmatrix} 1 \\ 1 \end{bmatrix}\right)^{\frac{1}{2}}$$

where $w$, $\Sigma$, and $\Sigma'$ are defined above.

Proposal 1C—in one embodiment, for two transmit antennas, if the correlation matrix $\Sigma$ of the transmitter noise is not known but the maximum magnitude of the transmitter noise correlation coefficient $\rho$ is bounded by $\rho_{wc}$, then:

$$EVM_{port,wc}(\rho_{wc}) = \begin{cases} \min(EVM_1, EVM_2)\sqrt{\frac{1-\rho_{wc}^2}{1+\beta^2-2\rho_{wc}\beta}} & \rho_{wc} \leq \beta \\ \min(EVM_1, EVM_2) & \rho_{wc} > \beta \end{cases}$$

where $$\beta = \frac{\min(EVM_1, EVM_2)}{\max(EVM_1, EVM_2)}$$

and $$\sqrt{\frac{1-\rho_{wc}^2}{1+\beta^2-2\rho_{wc}\beta}} \leq 1.$$

Proposal 1D—in one embodiment, if the number of transmit antennas is greater than two, or if the correlation matrix $\Sigma$ of the transmitter noise is not known, then:

$$EVM_{port} = \min(EVM_1, EVM_2).$$

In the Proposal 1 above, the method that is used to define $EVM_{port}$ can be determined by the capabilities of the test equipment. For example, if the test equipment can measure the correlation matrix of the antenna noise, then Proposal 1b can be used to define EVM for the antenna port. Alternatively, if the test equipment can only measure $EVM_1$ and $EVM_2$, the not the correlation matrix, then the port EVM can be defined as in Proposal 1D.

Also, for the case of an antenna port with N antennas less than or equal to the number of receive antennas, we have the following for the case that and the cross-correlation of the transmitter noise is either zero or unknown:

Proposal 2—in one embodiment, if the transmitter noise n at the N antenna connectors is observed to be independent so that the observed covariance matrix $\Sigma = \langle n^H n \rangle$ is diagonal, then the port EVM is given as:

$$EVM_{port} = \left(\frac{\sum_{i=1}^N \prod_{j=1, j\neq i}^N EVM_j^2}{\sum_{i=1}^N EVM_i^2}\right)^{\frac{1}{2}}$$

Furthermore, in one embodiment, it may be beneficial to set per antenna EVM requirements equal to $EVM_{req}/\sqrt{N}$ for where $EVM_{req}$ is the single antenna EVM requirement for the given modulation since if the per antenna EVM's are less than this value, then $EVM_{port}$ will be less than $EVM_{req}$. This also protects against transmitting a small amount of power with very low EVM over one antenna to artificially push the $EVM_{port}$ low since $EVM_{port}$ is less than the minimum of the EVM values over all N antenna connectors.

In one embodiment, if the transmitter noise is correlated so that $\Sigma$ is not diagonal, then the EVM for the port or layer can be computed either as:

$$EVM_{port} = 100 \cdot \sqrt{(w^H \Sigma^{-1} w)^{-1}}$$

where w has dimension N×1 and the matrix X has dimension N×N. Equivalently, the port EVM can be expressed as:

$$EVM_{port} = 100 \cdot \left(1_{1 \times N} \Sigma'^{-1} 1_{N \times 1}\right)^{-\frac{1}{2}}$$

where $\Sigma'$ has dimension $N \times N$ and is given by $\Sigma' = \langle n'^H n' \rangle$.

In one embodiment, if the covariance of the transmitter noise at the N antenna connectors is unknown, then the port EVM can be computed as:

$$EVM_{port} = \min(EVM_1, EVM_2, \ldots, EVM_N)$$

In one embodiment, the motivation for correctly defining the EVM for an antenna port is that the EVM definition is related to the maximum power reduction ("MPR") or A-MPR that is needed to meet emissions requirements. Thus, in one embodiment, if the MPR/A-MPR is not defined correctly, the amount of power that can be transmitted for a given constellation will be reduced. Currently, there are two proposals for defining EVM, neither of which is correct. The existing proposals are:

Proposal A: $EVM_{port} = \sqrt{(P_1 * EVM_1^2 + P_2 * EVM_2^2)/(P_1 + P_2)}$ where $P_1$ and $P_2$ denote the power measured at the first and second antenna connectors.

Proposal B: $EVM_{port} = \max(EVM_1, EVM_2)$ (e.g., both antennas must meet the EVM requirement individually).

where the current agreement is Proposal A, though this proposal is not technically justified.

It can be shown that each of the port EVM definitions in Proposal 1 lead to an EVM value that is less than or equal to the EVM in Proposals A and B.

In first example in which $EVM_1 = EVM_2$ and $P_1 = P_2$, the EVM for Proposals A and B are the following:

Proposal A: $EVM_{port} = \sqrt{(P_1 * EVM_1^2 + P_1 * EVM_1^2)/(P_1 + P_1)} = EVM_1$ Proposal B: $EVM_{port} = \max(EVM_1, EVM_1) = EVM_1$ so that the port EVM for both methods is the same. If it is assumed that the noise at the two antenna connectors is independent, then for Proposal 1a we have:

$$EVM_{port} = \sqrt{\frac{EVM_1^2 EVM_1^2}{EVM_1^2 + EVM_2^2}} = \frac{1}{\sqrt{2}} EVM_1$$

As a result, the MPR required to achieve a given port $EVM_{port}$ is reduced since the values of $EVM_1$ and $EVM_2$ can be larger by $\sqrt{2}$ and still meet the $EVM_{port}$ requirement.

In one embodiment, if the noise at the two antenna connectors is correlated and the covariance is unknown, then from Proposal 1D:

$$EVM_{port} = \min(EVM_1, EVM_2) = EVM_1,$$

and Proposal 1d gives the same $EVM_{port}$ as Proposal A and Proposal B.

Figure 5:
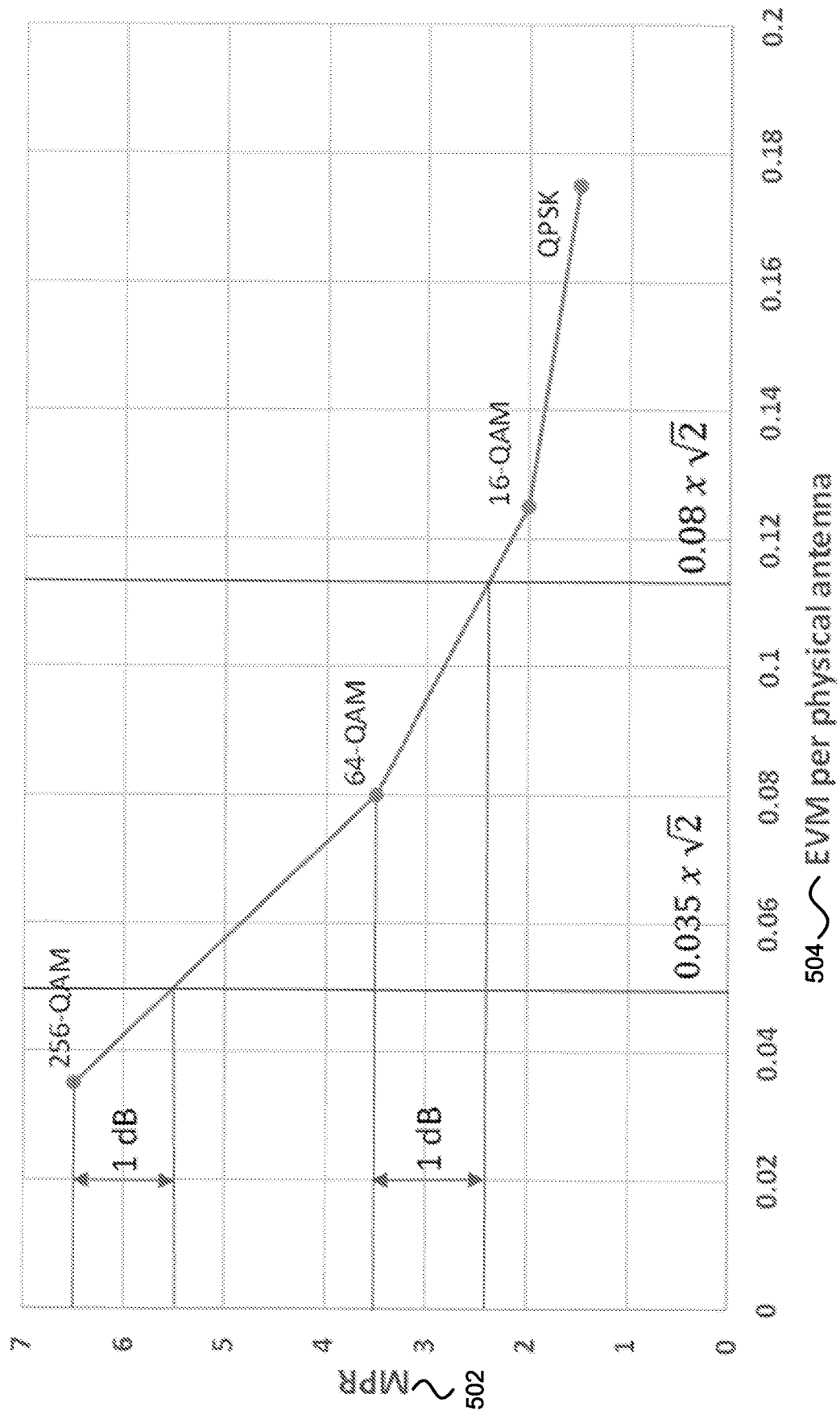
FIG. 5 depicts a chart illustrating an example of MPR for CP-OFDM as a function of EVM.

In one embodiment, for larger signal constellations, the EVM requirement is the primary driver of MPR. FIG. 5 shows the NR MPR 502 for an inner allocation as a function of the modulation order and the EVM 504. From FIG. 5 it can be observed that a relaxation of the per antenna EVM by V corresponds to approximately 1 dB MPR reduction for 64-QAM and 256-QAM, and MPR 502 can be reduced by 0.5 dB for 16-QAM. Thus, there is some benefit in defining a port EVM as it allows a reduction in MPR while still meeting the required lower bound on the link signal quality.

For a second example, given the case that $EVM_1 = EVM_2/V$ and $P_1 = P_2$, the EVM for Proposals A and B are the following:

Proposal A $$EVM_{port} = \sqrt{(P_1 * EVM_2^2/2 + P_1 * EVM_2^2)/(P_1 + P_1)} = \frac{\sqrt{3}}{2} EVM_2.$$

Proposal B: $EVM_{port} = \max(EVM_2/\sqrt{2}, EVM_2) = EVM_2$.

If it is assumed that the noise at the two antenna connectors is independent, then for Proposal 1a we have:

$$EVM_{port} = \sqrt{\frac{(EVM_2^2/2) EVM_2^2}{EVM_2^2/2 + EVM_2^2}} = \frac{1}{\sqrt{3}} EVM_2$$

Because $EVM_{port}$ for Proposal 1a is a factor of 1.5 $((\sqrt{3}/2)/(1/\sqrt{3}))$ less than $EVM_{port}$ for Proposal A, it follows that $EVM_1$ and $EVM_2$ can be larger by a factor of 1.5 with Proposal 1a and still meet the same $EVM_{port}$ requirement as Proposal A. Similarly, because $EVM_{port}$ for Proposal 1a is a factor of $\sqrt{3}$ $(1/(1/\sqrt{3}))$ less than $EVM_{port}$ for Proposal B, it follows that $EVM_1$ and $EVM_2$ can be larger by a factor of $\sqrt{3}$ with Proposal 1a and still meet the same $EVM_{port}$ requirement as Proposal B.

Alternatively, if it is assumed that the noise at the two antenna connectors is correlated and the covariance is unknown, then from Proposal 1d, we have $$EVM_{port} = \min(EVM_2/\sqrt{2}, EVM_2) = EVM_2/\sqrt{2}.$$

Because $EVM_{port}$ for Proposal 1d is a factor of $\sqrt{3/2}$ $(\sqrt{3}/2)/(1/\sqrt{2}))$ less than $EVM_{port}$ for Proposal A, it follows that $EVM_1$ and $EVM_2$ can be larger by a factor of 3/2 with Proposal 1d and still meet the same $EVM_{port}$ requirement as Proposal A. Similarly, because $EVM_{port}$ for Proposal 1d is a factor of $\sqrt{2}$ less than $EVM_{port}$ for Proposal B, it follows that $EVM_1$ and $EVM_2$ can be larger by a factor of $\sqrt{2}$ with Proposal 1d and still meet the same $EVM_{port}$ requirement as Proposal B.

Figure 6:
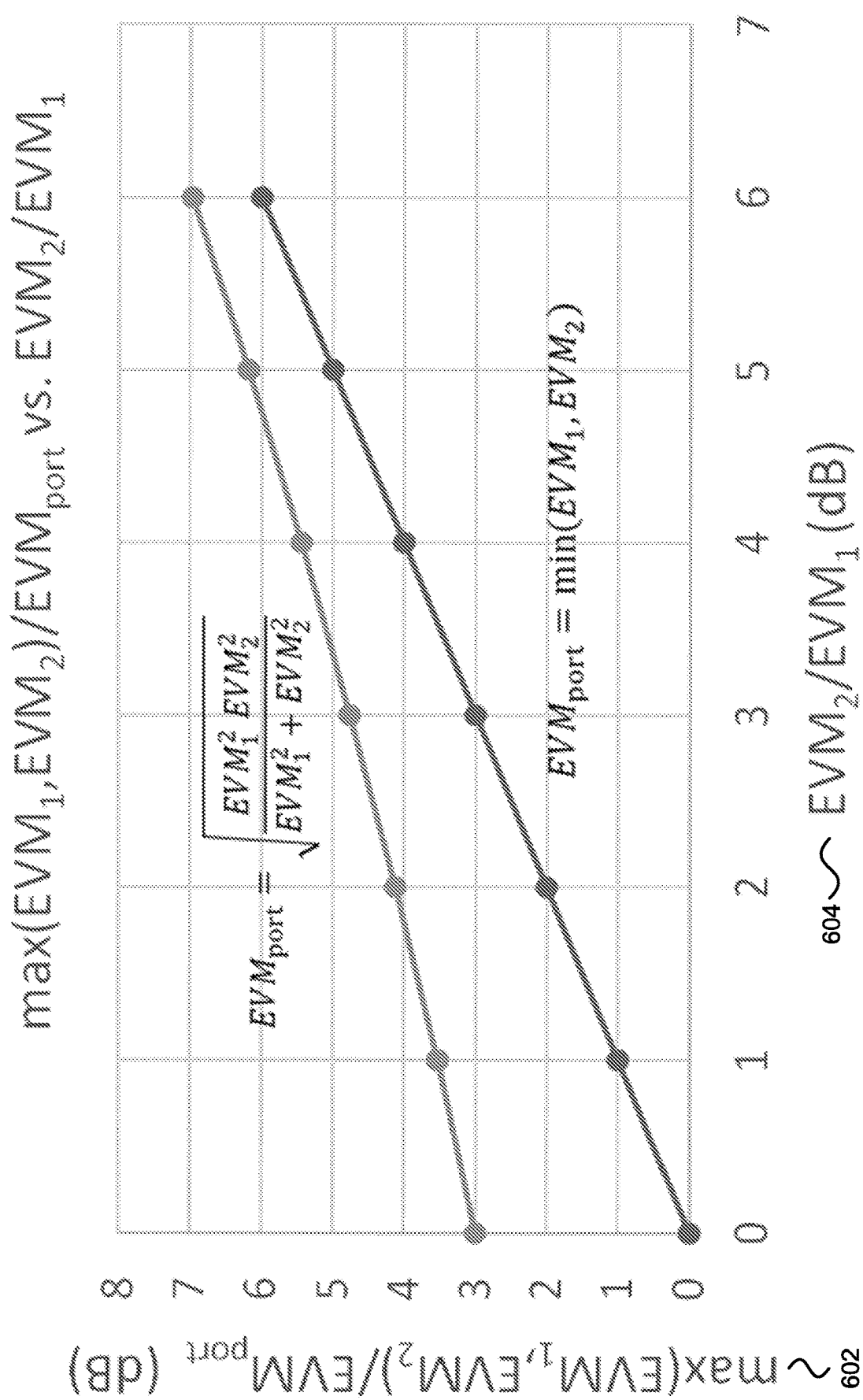
FIG. 6 depicts a chart illustrating an example of a ratio of $EVM_{port}$ definitions for Proposal B and Proposal 1 as a function of $EVM_2/EVM_1$.

FIG. 6 shows the ratio of the port EVM for Proposal B $(\max(EVM_1, EVM_2))$ 602 to the port EVM definition in Proposal 1 as a function of the ratio $EVM_2/EVM_1$ 604 for the case that the noise at the antenna connectors is uncorrelated (Proposal 1a) and also for the case that the correlation of the noise at the two antenna connectors is unknown (Proposal 1d). The ratio $\max(EVM_1, EVM_2)/EVM_{port}$, in one embodiment, can be interpreted as the amount that the per physical antenna EVM can be relaxed for Proposal 1 relative to Proposal B for the same value of $EVM_{port}$. If Proposal B is used instead of Proposal 1, in one embodiment, the MPR needed to achieve a given EVM value for the port may be increased by several dBs.

In one embodiment, the analysis for Proposal 1 assumes the antenna port is comprised of two physical antennas and there are two receive antennas. However, in one embodiment, this analysis can be extended to an arbitrary number of physical antennas per port so long as the receiver has the same number of antennas. Specifically, the two expressions for the port EVM are given by:

$$EVM_{port} = 100 \cdot \sqrt{\left(w^H \Sigma^{-1} w\right)^{-1}}$$

$$EVM_{port} = 100 \cdot \left(\begin{bmatrix} 1 \\ 1 \end{bmatrix}^H \Sigma'^{-1} \begin{bmatrix} 1 \\ 1 \end{bmatrix}\right)^{-\frac{1}{2}}$$

where w, $\Sigma$, and $\Sigma'$ are defined as below $$z = wx + n,$$

$$\begin{bmatrix} w_1 \\ w_2 \end{bmatrix} = \begin{bmatrix} g_1 & w'_1 \\ g_2 & w'_2 \end{bmatrix}$$

$$\Sigma = E(n^H n)$$

$$n' = \begin{bmatrix} n'_1 \\ n'_2 \end{bmatrix} = \begin{bmatrix} \hat{w}_1^{-1} & n_1 \\ \hat{w}_2^{-1} & n_2 \end{bmatrix}$$

$$\Sigma' = \langle n'^H n' \rangle$$

The vectors w', $\hat{w}$, and g can be found in FIGS. 3 and 4. Note that the vectors and matrices in these expressions scale with the number of physical antennas used to implement the antenna port. That is, if there are N physical antennas, then the vectors w, n, w', n' all have dimension N×1. Similarly, if there are N physical antennas, the matrices $\Sigma$, and $\Sigma'$ have dimension N×N. The only modification that is needed is for the equation:

$$EVM_{port} = 100 \cdot \left( \begin{bmatrix} 1 \\ 1 \end{bmatrix}^H \Sigma'^{-1} \begin{bmatrix} 1 \\ 1 \end{bmatrix} \right)^{-\frac{1}{2}}.$$

As written, with the 2×1 matrices [1 1] and [1 1]$^H$, this equation applies for two physical antennas. To extend to the general case of N antennas, let $1_{N \times M}$ denote a matrix of dimension N×M having all entries equal to 1. With this definition, this port definition can be extended to the case of N physical transmit antennas as:

$$EVM_{port} = 100 \cdot (1_{1 \times N} \Sigma'^{-1} 1_{N \times 1})^{-\frac{1}{2}}.$$

In the case of two antennas, if the transmitter noise is observed to be independent at the antenna connectors so that the observed covariance matrix $\Sigma = \langle n^H n \rangle$ is diagonal, then the port EVM is given as:

$$EVM_{port} = \sqrt{\frac{EVM_1^2 EVM_2^2}{EVM_1^2 + EVM_2^2}}.$$

Proposal 1a, in one embodiment, can be extended to N antennas (again assuming N antennas at the receiver and a linear unbiased MMSE receiver) as in the following:

$$EVM_{port} =$$

$$100 \cdot (1_{1 \times N} \Sigma'^{-1} 1_{N \times 1})^{-\frac{1}{2}} = \left( \sum_{i=1}^{N} \frac{1}{EVM_i^2} \right)^{-\frac{1}{2}} = \left( \frac{\prod_{i=1}^{N} EVM_i^2}{\sum_{i=1}^{N} \prod_{j=1, j \neq i}^{N} EVM_j^2} \right)^{\frac{1}{2}}$$

So that Proposal 1a for N transmit antennas is given as:

$$EVM_{port} = \left( \frac{\prod_{i=1}^{N} EVM_i^2}{\sum_{i=1}^{N} \prod_{j=1, j \neq i}^{N} EVM_j^2} \right)^{\frac{1}{2}}$$

In the case that $$EVM_1 = EVM_2 = \ldots = EVM_N$$

it follows that $$EVM_{port} = \left( \frac{\prod_{i=1}^{N} EVM_i^2}{\sum_{i=1}^{N} \prod_{j=1, j \neq i}^{N} EVM_j^2} \right)^{\frac{1}{2}} = \frac{EVM_1}{\sqrt{N}}$$

Proposal 1d that applies in the case that the transmitter noise is correlated but the correlation is unknown can also be extended to an arbitrary number of antennas. For two antennas, it was shown above that $EVM_{port}$ can be defined as $$EVM_{port} \leq \min(EVM_1, EVM_2).$$

Above, this is shown by maximizing the general EVM expression $$EVM_{port} = 100 \cdot (1_{1 \times N} \Sigma'^{-1} 1_{N \times 1})^{-\frac{1}{2}}$$

over the set of allowed covariance values E. For the general case of N antennas, in one embodiment, a bound on $EVM_{port}$ can be derived in a more general way. If the number of receive antennas is equal to the number of transmit antennas and the channel H between the transmitter and the receiver is invertible, then the receiver can invert the channel and select the transmitter output with the smallest EVM. As a result, if the transmitter and the receiver have N antennas and the correlation of the transmitter noise is unknown, Proposal 1d can be extended as $$EVM_{port} = \min(EVM_1, EVM_2, \ldots, EVM_N)$$

Regarding relaxed per antenna EVM and reduced MPR when transmitting from an antenna port with more than one antenna, in one embodiment, as indicated in FIG. 6, if the transmitter noise is uncorrelated, the difference between $$EVM_{port} = \sqrt{\frac{EVM_1^2 EVM_2^2}{EVM_1^2 + EVM_2^2}}$$

and $\max(EVM_1, EVM_2)$ is minimum and equal to 3 dB when $EVM_1 = EVM_2$. As a result, in one embodiment, if the per antenna EVM is relaxed by 3 dB relative to the desired port EVM, the port EVM requirement will still be met. More generally, with N transmit and N receive antennas and uncorrelated transmitter noise, the antenna EVM can be relaxed by 10 $\log_{10}$ N dB relative to the desired port EVM and the port EVM requirement will still be met.

To show this explicitly, in one embodiment, let $EVM_{req}$(m) denotes the single antenna EVM requirement for the given modulation type m and note that this same requirement must be met by the antenna port. In the case of two transmit antennas, in one embodiment, assume that the transmitter noise is uncorrelated. Let the per antenna EVM requirements be set as $$EVM_1 = EVM_2 = \sqrt{2} EVM_{req}(m)$$

where $EVM_{req}$(m) is the port EVM requirement for the modulation m. If the transmitter noise is uncorrelated, then $$EVM_{port} = \sqrt{\frac{(\sqrt{2}\,EVM_{req}(m))^2(\sqrt{2}\,EVM_{req}(m))^2}{(\sqrt{2}\,EVM_{req}(m))^2+(\sqrt{2}\,EVM_{req}(m))^2}} = EVM_{req}(m)$$

and $EVM_{port}$ is equal to the EVM requirement $EVM_{req}(m)$ for the modulation type.

More generally, in one embodiment, for the case of N transmit antennas and N receive antennas (assuming a linear unbiased MMSE receiver is used), let $$EVM_1 = EVM_2 = \ldots = EVM_N = \sqrt{N}\,EVM_{req}(m)$$

where $EVM_{req}$ denotes the single antenna EVM requirement for the given modulation type. If the transmitter noise is uncorrelated, then $$EVM_{port} = \left(\frac{\sum_{i=1}^{N}\prod_{j=1,j\neq i}^{N}\sqrt{N}\,EVM_{req}^2(m)}{\sum_{i=1}^{N}\sqrt{N}\,EVM_{req}^2(m)}\right)^{\frac{1}{2}} = EVM_{req}(m)$$

and $EVM_{port}$ is equal to the EVM requirement $EVM_{req}(m)$ for the modulation.

As noted in FIG. 5, by relaxing the EVM requirement by a factor of $\sqrt{2}$, the MPR can be reduced by approximately 1 dB for 256-QAM and 64-QAM, and 0.5 dB for 16 QAM. Thus, what is proposed is that if it is assumed that the transmitter noise is uncorrelated, then the port EVM for two transmit antennas is defined as $$EVM_{port} = \sqrt{\frac{EVM_1^2 EVM_2^2}{EVM_1^2 + EVM_2^2}}.$$

Additionally, if $EVM_{req}$ denotes the EVM requirement for the given modulation, then it is required that $$EVM_1 \leq \sqrt{2}\,EVM_{req}(m) \text{ and } EVM_2 \leq \sqrt{2}\,EVM_{req}(m)$$

so that $$EVM_{port} \leq EVM_{req}(m)).$$

Furthermore, for each modulation type m, single antenna MPR is defined for an EVM requirement equal to $\sqrt{2}\,EVM_{req}(m)$ where $EVM_{req}(m)$ is the single antenna EVM requirement for modulation type m. In one embodiment, for a UE transmitting modulation type m on an antenna port comprised of two antennas, the per antenna MPR is limited to the MPR corresponding to $\sqrt{2}\,EVM_{req}(m)$.

In one embodiment involving two transmit antennas where the transmitter correlation is not known but is bounded by $\rho_{wc}$ (where $0 \leq \rho_{wc} \leq 1$), it is assumed that the EVM requirement for the antenna port is given by $EVM_{req}(m)$ where m is the modulation type. Further, it is assumed that per antenna EVM requirements equal $$EVM_1 = \sqrt{\frac{2}{1+\rho_{wc}}}\,EVM_{req}(m) \text{ and } EVM_2 = \sqrt{\frac{2}{1+\rho_{wc}}}\,EVM_{req}(m).$$

From equation (2) in above:

$$EVM_{port}(\rho) \leq \sqrt{\frac{EVM_1^2 EVM_2^2 - \rho^2 EVM_1^2 EVM_2^2}{EVM_1^2 + EVM_2^2 - 2\rho EVM_1 EVM_2}} =$$

$$\sqrt{\frac{\left(\frac{2}{1+\rho_{wc}}\right)^2 EVM_{req}^4(m)(1-\rho^2)}{2\left(\frac{2}{1+\rho_{wc}}\right)EVM_{req}^2(m)(1-\rho)}} =$$

$$EVM_{req}(m)\sqrt{\frac{\left(\frac{2}{1+\rho_{wc}}\right)(1+\rho)}{2}} = EVM_{req}(m)\sqrt{\frac{1+\rho}{1+\rho_{wc}}}$$

So, as long $\rho \leq \rho_{wc}$:

$$EVM_{port}(\rho) \leq EVM_{req}(m).$$

where $EVM_{req}(m)$ is the EVM requirement for the given modulation type. Since $$\sqrt{\frac{2}{1+\rho_{wc}}} \geq 1,$$

the requirements for $EVM_1$ and $EVM_2$ are relaxed relative to $EVM_{req}(m)$, and the MPR needed to meet the per antenna EVM requirements is reduced as indicated in FIG. 5.

It can be noted, that so long as $\rho_{wc}$ is reasonably small, the per antenna EVM relaxation is still significant. For example, if $\rho_{wc}=0.1$, then $$\sqrt{\frac{2}{1+\rho_{wc}}} = 0.95\sqrt{2}$$

which is almost the same EVM relaxation, $\sqrt{2}$, that can be allowed when the transmitter noise is uncorrelated and $\rho=0$.

In one embodiment, it should be noted that the above discussion does not apply to multi-layer MIMO transmission. The reason for this is that the linear unbiased MMSE receiver for multi-layer transmission is different than the linear unbiased MMSE receiver for single layer transmission. When receiving the first layer of a multi-layer transmission, the linear unbiased MMSE receiver must minimize interference from the second layer. Similarly, when receiving the second layer of a multi-layer transmission, the linear unbiased MMSE receiver must minimize the interference from the first layer. Thus, in general, it will not be possible to reduce the MPR relative to the single antenna MPR when transmitting two layers from two antennas.

So, in general, the MPR needed for a given modulation type will be different for single layer transmission than for dual layer transmission. Alternatively, MPR may be defined per-antenna per modulation type for single-layer modulation using the EVM expressions in Proposal 1.

In one embodiment, because the expressions in Proposal 1 do not consider the different power transmitted on the different antennas (theoretically this is not necessary), it may be beneficial to place a bound on the maximum difference in power between the transmitting antennas (minimum relative to maximum or minimum relative to average) so that the UE cannot transmit very low power on one antenna in order to skew port EVM measurement which can be dominated by the antenna which has the minimum EVM.

In one embodiment, the same approach proposed here for an antenna port comprised of multiple antennas can be applied to two different polarizations for an antenna array. For example, if a single layer is transmitted on two different polarizations of an antenna array, it is not necessary for the transmission on each polarization to meet the link EVM requirement. Rather, it is only necessary for the combination of the two polarizations to meet the link EVM requirement, where the combiner can be an unbiased MMSE combiner. This same concept can also be applied to multi-point transmission where the same signal is transmitted from multiple transmission points.

Figure 7:
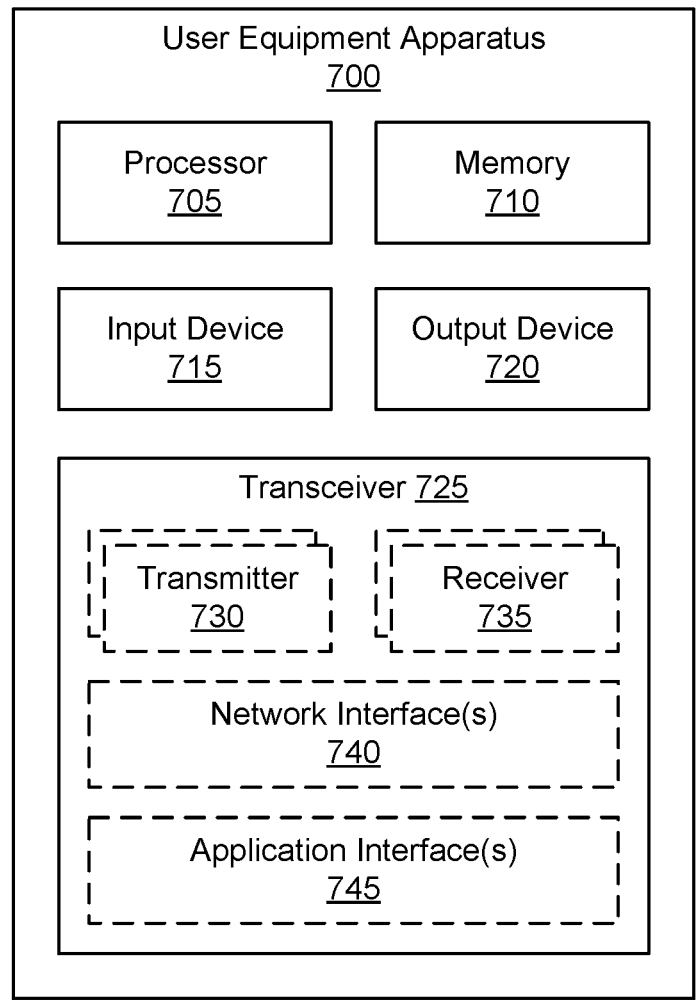
FIG. 7 is a block diagram illustrating one embodiment of a user equipment apparatus that may be used for determining transmitter EVM for an antenna port.

FIG. 7 depicts a user equipment apparatus 700 that may be used for calculating an EVM of a transmitter, according to embodiments of the disclosure. In various embodiments, the user equipment apparatus 700 is used to implement one or more of the solutions described above. The user equipment apparatus 700 may be one embodiment of the remote unit 105 and/or the transmitter 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

In various embodiments, the transceiver 725 receives, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the processor 705 determines an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, in response to a correlation coefficient of the transmitter noise being unknown, the correlation coefficient is bounded by $\rho_{max}$ such that $0 \leq \rho < \rho_{max}$ and the antenna port EVM is bounded by:

$$EVM_{port,wc}(\rho_{max}) = \begin{cases} \min(EVM_1, EVM_2) \sqrt{\dfrac{1-\rho_{max}^2}{1+\beta^2 - 2\rho_{max}\beta}} & \rho_{max} \leq \beta \\ \min(EVM_1, EVM_2) & \rho_{max} > \beta \end{cases}$$

where $$\rho = \frac{|E(n'_1 n_2'^*)|}{\sqrt{E(|n'_1|^2)(|n'_2|^2)}} = \frac{|E(n'_1 n_2'^*)|}{EVM_1 EVM_2},$$

$$\beta = \frac{\min(EVM_1, EVM_2)}{\max(EVM_1, EVM_2)}$$

$$\sqrt{\frac{1-\rho_{max}^2}{1+\beta^2 - 2\rho_{max}\beta}} \leq 1$$

and $EVM_i$ for $1 \leq i \leq N$ denotes the EVM measured at the i-th antenna connector.

In one embodiment, in response to transmitter noise n at the N antenna connectors being independent such that the covariance matrix $\Sigma = \langle n^H n \rangle$ is diagonal, the EVM for the antenna port is given by: )

$$EVM_{port} = \left(\frac{\sum_{i=1}^{N} \prod_{j=1, j \neq i}^{N} EVM_j^2}{\sum_{i=1}^{N} EVM_i^2}\right)^{\frac{1}{2}}$$

where the covariance matrix $\Sigma'$ is diagonal and $EVM_i$ for $1 \leq i \leq N$ denotes the EVM measured at the i-th antenna connector.

In one embodiment, the processor 705 sets per-antenna EVM requirements equal to $EVM_{req}/\sqrt{N}$ where $EVM_{req}$ is a single antenna EVM requirement for a given modulation. In one embodiment, the EVM for the antenna port is given by:

$$EVM_{port} = \min(EVM_1, EVM_2, \ldots, EVM_N)$$

in response to the covariance matrix $\Sigma'$ being unknown

In one embodiment, the number of antenna connectors is at least two. In one embodiment, the transmitter comprises a User Equipment transmitter for transmitting uplink signals to a base station, the method further comprising defining a noise floor of the base station due to transmitter noise using the calculated EVM.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to calculating an EVM of a transmitter. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display.

In other embodiments, the output device 720 may be located near the input device 715. The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
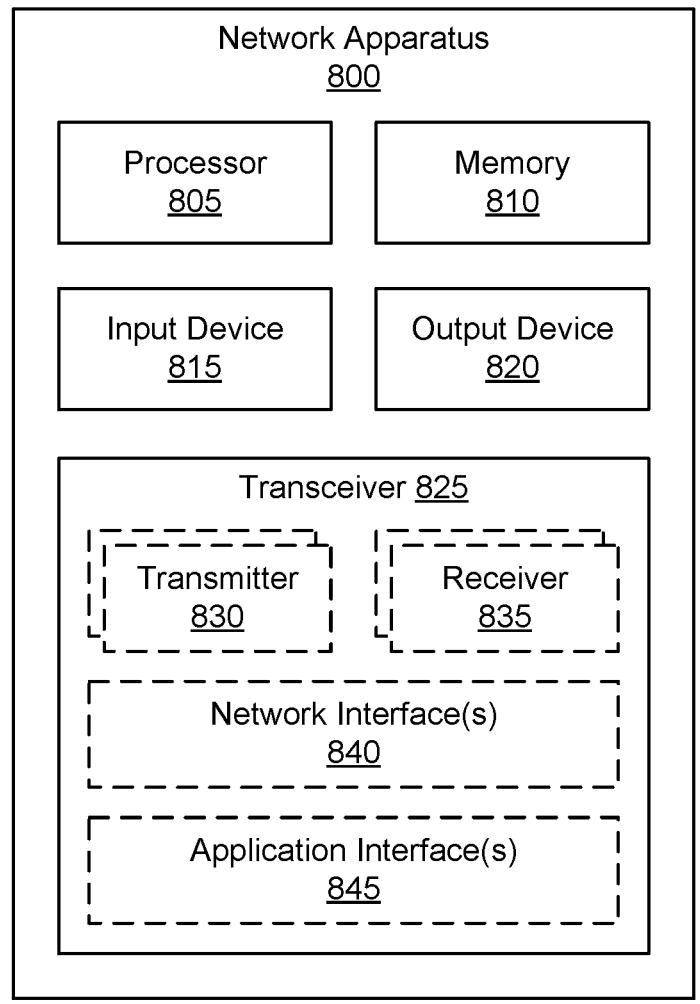
FIG. 8 is a block diagram illustrating one embodiment of a network apparatus that may be used for determining transmitter EVM for an antenna port.

FIG. 8 depicts a network apparatus 800 that may be used for calculating an EVM of a transmitter, according to embodiments of the disclosure. In one embodiment, network apparatus 800 may be one implementation of an evaluation device, such as the test equipment 111, the base unit 121, the evaluator 220, and/or the receiver/evaluator 400, as described above. Furthermore, the base network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network apparatus 800 is a RAN node (e.g., gNB) that communicates with one or more UEs, as described herein. In such embodiments, the processor 805 controls the network apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the transceiver 825 receives, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the processor 805 determines an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, in response to a correlation coefficient of the transmitter noise being unknown, the correlation coefficient is bounded by $\rho_{max}$ such that $0 \leq \rho < \rho_{max}$ and the antenna port EVM is bounded by:

$$EVM_{port,wc}(\rho_{max}) = \begin{cases} \min(EVM_1, EVM_2) \sqrt{\dfrac{1-\rho_{max}^2}{1+\beta^2 - 2\rho_{max}\beta}} & \rho_{max} \leq \beta \\ \min(EVM_1, EVM_2) & \rho_{max} > \beta \end{cases}$$

where $$\rho = \frac{|E(n'_1 n'^*_2)|}{\sqrt{E(|n'_1|^2)(|n'_2|^2)}} = \frac{|E(n'_1 n'^*_2)|}{EVM_1 EVM_2},$$

$$\beta = \frac{\min(EVM_1, EVM_2)}{\max(EVM_1, EVM_2)}$$

$$\sqrt{\frac{1-\rho_{max}^2}{1+\beta^2 - 2\rho_{max}\beta}} \leq 1$$

and $EVM_i$ for $1 \leq i \leq N$ denotes the EVM measured at the i-th antenna connector.

In one embodiment, in response to transmitter noise n at the N antenna connectors being independent such that the covariance matrix $\Sigma = \langle n^H n \rangle$ is diagonal, the EVM for the antenna port is given by:

$$EVM_{port} = \left( \frac{\sum_{i=1}^N \prod_{j=1, j \neq i}^N EVM_j^2}{\sum_{i=1}^N EVM_i^2} \right)^{\frac{1}{2}}$$

where the covariance matrix $\Sigma'$ is diagonal and $EVM_i$ for $1 \leq i \leq N$ denotes the EVM measured at the i-th antenna connector.

In one embodiment, the processor 805 sets per-antenna EVM requirements equal to $EVM_{req}/\sqrt{N}$ where $EVM_{req}$ is a single antenna EVM requirement for a given modulation. In one embodiment, the EVM for the antenna port is given by:

$$EVM_{port} = \min(EVM_1, EVM_2, \ldots, EVM_N)$$

in response to the covariance matrix $\Sigma'$ being unknown

In one embodiment, the number of antenna connectors is at least two. In one embodiment, the transmitter comprises a User Equipment transmitter for transmitting uplink signals to a base station, the method further comprising defining a noise floor of the base station due to transmitter noise using the calculated EVM.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to calculating an EVM of a transmitter. For example, the memory 810 may store parameters, configurations, resource assignments, policies, and the like, as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
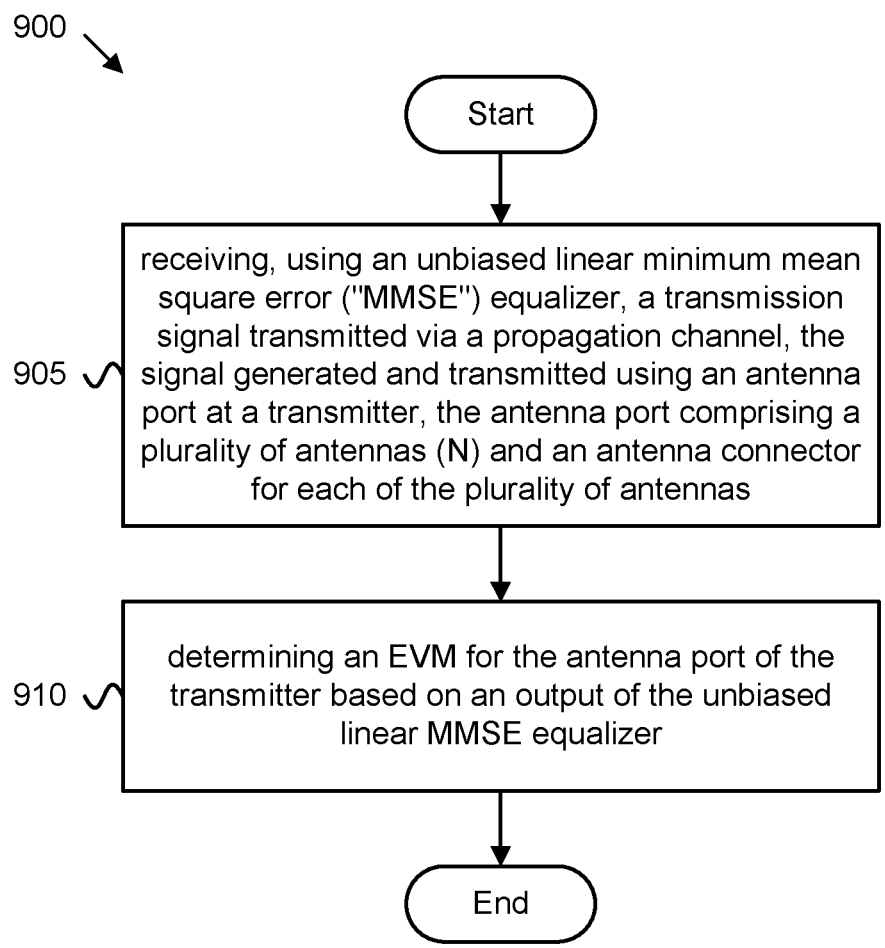
FIG. 9 is a block diagram illustrating one embodiment of a method for determining transmitter EVM for an antenna port.

FIG. 9 depicts one embodiment of a method 900 for calculating an EVM of a transmitter, according to embodiments of the disclosure. In various embodiments, the method 900 is performed by a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the method 900 is performed by a processor, such as a microcontroller, a microprocessor, a CPU, a GPU, an auxiliary processing unit, a FPGA, or the like.

In one embodiment, the method 900 begins and receives 905, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the method 900 determines 910 an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$. The method 900 ends.

Figure 10:
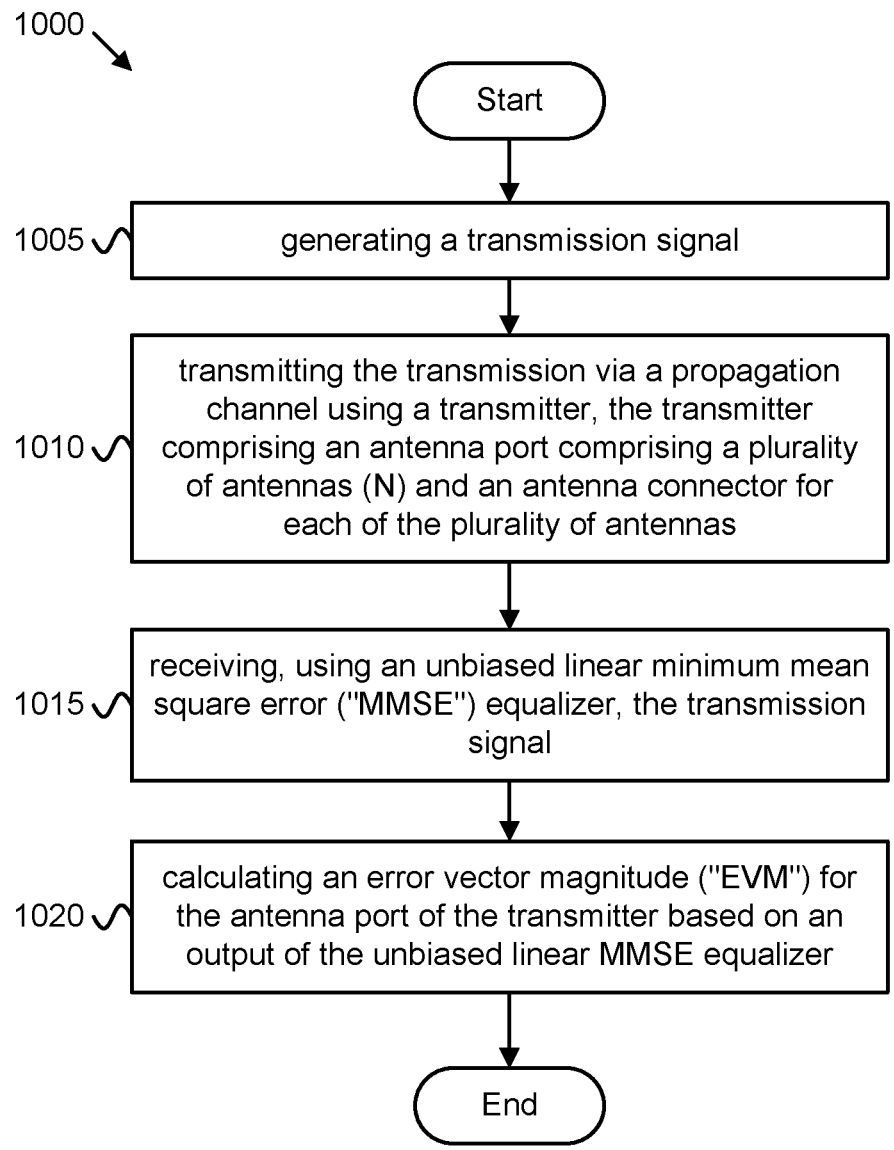
FIG. 10 is a block diagram illustrating one embodiment of another method for determining transmitter EVM for an antenna port.

FIG. 10 depicts one embodiment of a method 1000 for calculating an EVM of a transmitter, according to embodiments of the disclosure. In various embodiments, the method 1000 is performed by a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the method 1000 is performed by a processor, such as a microcontroller, a microprocessor, a CPU, a GPU, an auxiliary processing unit, a FPGA, or the like.

In one embodiment, the method 1000 begins and generates 1005 a transmission signal and transmits 1010 the transmission via a propagation channel using a transmitter, the transmitter comprising an antenna port comprising a plurality of antennas (N) and an antenna connector for each of the plurality of antennas. In one embodiment, the method 1000 receives 1015, using an unbiased linear minimum mean square error ("MMSE") equalizer, the transmission signal. In one embodiment, the method 1000 calculates 1020 an error vector magnitude ("EVM") for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix with dimension N×N and 1d given by $\Sigma' = \langle n'^H n' \rangle$. The method 1000 ends.

A first apparatus is disclosed for calculating an EVM of a transmitter. In various embodiments, the first apparatus includes a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the first apparatus includes a processor, such as a microcontroller, a microprocessor, a CPU, a GPU, an auxiliary processing unit, a FPGA, or the like.

In one embodiment, the first apparatus includes a transceiver that receives, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the first apparatus includes a processor that determines an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, in response to a correlation coefficient of the transmitter noise being unknown, the correlation coefficient is bounded by $\rho_{max}$ such that $0 \leq \rho < \rho_{max}$ and the antenna port EVM is bounded by:

$$EVM_{port,wc}(\rho_{max}) = \begin{cases} \min(EVM_1, EVM_2)\sqrt{\dfrac{1-\rho_{max}^2}{1+\beta^2-2\rho_{max}\beta}} & \rho_{max} \leq \beta \\ \min(EVM_1, EVM_2) & \rho_{max} > \beta \end{cases}$$

where $$\rho = \frac{|E(n_1' n_2'^*)|}{\sqrt{E(|n_1'|^2)(|n_2'|^2)}} = \frac{|E(n_1' n_2'^*)|}{EVM_1 EVM_2},$$

$$\beta = \frac{\min(EVM_1, EVM_2)}{\max(EVM_1, EVM_2)}$$

$$\sqrt{\frac{1-\rho_{max}^2}{1+\beta^2-2\rho_{max}\beta}} \leq 1$$

and $EVM_i$ for $1 \leq i \leq N$ denotes the EVM measured at the i-th antenna connector.

In one embodiment, in response to transmitter noise n at the N antenna connectors being independent such that the covariance matrix $\Sigma = \langle n^H n \rangle$ is diagonal, the EVM for the antenna port is given by:

$$EVM_{port} = \left( \frac{\sum_{i=1}^{N} \prod_{j=1, j \neq i}^{N} EVM_j^2}{\sum_{i=1}^{N} EVM_i^2} \right)^{\frac{1}{2}}$$

where the covariance matrix $\Sigma'$ is diagonal and $EVM_i$ for $1 \leq i \leq N$ denotes the EVM measured at the i-th antenna connector.

In one embodiment, the processor sets per-antenna EVM requirements equal to $EVM_{req}/\sqrt{N}$ where $EVM_{req}$ is a single antenna EVM requirement for a given modulation. In one embodiment, the EVM for the antenna port is given by:

$$EVM_{port} = \min(EVM_1, EVM_2, \ldots, EVM_N)$$

in response to the covariance matrix $\Sigma'$ being unknown

In one embodiment, the number of antenna connectors is at least two. In one embodiment, the transmitter comprises a User Equipment transmitter for transmitting uplink signals to a base station, the method further comprising defining a noise floor of the base station due to transmitter noise using the calculated EVM.

A first method is disclosed for calculating an EVM of a transmitter, according to embodiments of the disclosure. In various embodiments, the first method is performed by a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the first method is performed by a processor, such as a microcontroller, a microprocessor, a CPU, a GPU, an auxiliary processing unit, a FPGA, or the like.

In one embodiment, the first method includes receiving, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas. In one embodiment, the first method includes determining an EVM for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

In one embodiment, in response to a correlation coefficient of the transmitter noise being unknown, the correlation coefficient is bounded by $\rho_{max}$ such that $0 \leq \rho < \rho_{max}$ and the antenna port EVM is bounded by:

$$EVM_{port,wc}(\rho_{max}) = \begin{cases} \min(EVM_1, EVM_2)\sqrt{\dfrac{1-\rho_{max}^2}{1+\beta^2-2\rho_{max}\beta}} & \rho_{max} \leq \beta \\ \min(EVM_1, EVM_2) & \rho_{max} > \beta \end{cases}$$

where $$\rho = \frac{|E(n_1' n_2'^*)|}{\sqrt{E(|n_1'|^2)(|n_2'|^2)}} = \frac{|E(n_1' n_2'^*)|}{EVM_1 EVM_2},$$

$$\beta = \frac{\min(EVM_1, EVM_2)}{\max(EVM_1, EVM_2)}$$

$$\sqrt{\frac{1-\rho_{max}^2}{1+\beta^2-2\rho_{max}\beta}} \leq 1$$

and $EVM_i$ for $1 \leq i \leq N$ denotes the EVM measured at the i-th antenna connector.

In one embodiment, in response to transmitter noise n at the N antenna connectors being independent such that the covariance matrix $\Sigma = \langle n^H n \rangle$ is diagonal, the EVM for the antenna port is given by:

$$EVM_{port} = \left( \frac{\sum_{i=1}^{N} \prod_{j=1, j \neq i}^{N} EVM_j^2}{\sum_{i=1}^{N} EVM_i^2} \right)^{\frac{1}{2}}$$

where the covariance matrix $\Sigma'$ is diagonal and $EVM_i$ for $1 \leq i \leq N$ denotes the EVM measured at the i-th antenna connector.

In one embodiment, the first method includes setting per-antenna EVM requirements equal to $EVM_{req}/\sqrt{N}$ where $EVM_{req}$ is a single antenna EVM requirement for a given modulation. In one embodiment, the EVM for the antenna port is given by:

$$EVM_{port} = \min(EVM_1, EVM_2, \ldots, EVM_N)$$

in response to the covariance matrix $\Sigma'$ being unknown

In one embodiment, the number of antenna connectors is at least two. In one embodiment, the transmitter comprises a User Equipment transmitter for transmitting uplink signals to a base station, the method further comprising defining a noise floor of the base station due to transmitter noise using the calculated EVM.

A first system is disclosed for calculating an EVM of a transmitter, according to embodiments of the disclosure. In various embodiments, the first system includes a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the first system includes a processor, such as a microcontroller, a microprocessor, a CPU, a GPU, an auxiliary processing unit, a FPGA, or the like.

In one embodiment, the first system includes a transmitting device that generates a transmission signal and transmits the transmission via a propagation channel using a transmitter, the transmitter comprising an antenna port comprising a plurality of antennas (N) and an antenna connector for each of the plurality of antennas. In one embodiment, the first system includes an evaluation device that receives, using an unbiased linear minimum mean square error ("MMSE") equalizer, the transmission signal and calculates an error vector magnitude ("EVM") for the antenna port of the transmitter based on an output of the unbiased linear MMSE equalizer, the EVM for the antenna port defined as:

$$EVM_{port} = 100 \cdot (1_{1 \times N} \Sigma'^{-1} 1_{N \times 1})^{-\frac{1}{2}}$$

where $\Sigma'$ is a covariance matrix with dimension N×N and is given by $\Sigma' = \langle n'^H n' \rangle$.

A second method is disclosed for calculating an EVM of a transmitter, according to embodiments of the disclosure. In various embodiments, the second method is performed by a transmitting device (such as the remote unit 105, the transmitter 205, and/or the user equipment apparatus 700) and an evaluation device (such as the test equipment 111, the base unit 121, the evaluator 220, the receiver/evaluator 400, and/or the network apparatus 800), as described above. In some embodiments, the second method is performed by a processor, such as a microcontroller, a microprocessor, a CPU, a GPU, an auxiliary processing unit, a FPGA, or the like.

In one embodiment, a second method includes generating a transmission signal and transmitting the transmission via a propagation channel using a transmitter, the transmitter comprising an antenna port comprising a plurality of antennas (N) and an antenna connector for each of the plurality of antennas. In one embodiment, the second method includes receiving, using an unbiased linear minimum mean square error ("MMSE") equalizer, the transmission signal and calculating an error vector magnitude ("EVM") for the antenna port of the transmitter based on an output of the unbiased linear MMSE equalizer, the EVM for the antenna port defined as:

$$EVM_{port} = 100 \cdot (1_{1 \times N} \Sigma'^{-1} 1_{N \times 1})^{-\frac{1}{2}}$$

where $\Sigma'$ is a covariance matrix with dimension N×N and is gen $\Sigma' = \langle n'^H n' \rangle$.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus, comprising:
a processor; and
a memory coupled to the processor, the memory comprising instructions that are executable by the processor to cause the apparatus to:

receive, using an unbiased linear minimum mean square error ("MMSE") equalizer, a transmission signal transmitted via a propagation channel, the transmission signal generated and transmitted using an antenna port at a transmitter, the antenna port comprising a plurality of antennas (N) and an antenna connector for each of the plurality of antennas; and determine an error vector magnitude ("EVM") for the antenna port of the transmitter based on an output of the unbiased linear MMSE equalizer, the EVM for the antenna port defined as:

$$EVM_{port} = 100 \cdot (1_{1 \times N} \Sigma'^{-1} 1_{N \times 1})^{-\frac{1}{2}}$$

where $\Sigma'$ is a covariance matrix of the transmitter noise with dimension N×N and is given by $\Sigma' = \langle n'^H n' \rangle$.

2. The apparatus of claim 1, wherein, in response to a correlation coefficient of the transmitter noise being unknown, the correlation coefficient is bounded by $\rho_{max}$ such that $0 \leq \rho < \rho_{max}$ and the antenna port EVM is bounded by:

$$EVM_{port,wc}(\rho_{max}) = \begin{cases} \min(EVM_1, EVM_2) \sqrt{\frac{1 - \rho_{max}^2}{1 + \beta^2 - 2\rho_{max}\beta}} & \rho_{max} \leq \beta \\ \min(EVM_1, EVM_2) & \rho_{max} > \beta \end{cases}$$

where $$\rho = \frac{|E(n'_1 n'^*_2)|}{\sqrt{E(|n'_1|^2)(|n'_2|^2)}} = \frac{|E(n'_1 n'^*_2)|}{EVM_1 EVM_2},$$

$$\beta = \frac{\min(EVM_1, EVM_2)}{\max(EVM_1, EVM_2)}$$

$$\sqrt{\frac{1 - \rho_{max}^2}{1 + \beta^2 - 2\rho_{max}\beta}} \leq 1.$$

and $EVM_i$ for $1 \leq i \leq N$ denotes the EVM measured at the i-th antenna connector.

3. The apparatus of claim 1, wherein, in response to transmitter noise n at the N antenna connectors being independent such that the covariance matrix $\Sigma = \langle n^H n \rangle$ is diagonal, the EVM for the antenna port is given by:

$$EVM_{port} = \left( \frac{\prod_{i=1}^{N} EVM_i^2}{\sum_{i=1}^{N} \prod_{j=1, j \neq i}^{N} EVM_j^2} \right)^{\frac{1}{2}}$$

where the covariance matrix $\Sigma'$ is diagonal and $EVM_i$ for $1 \leq i \leq N$ denotes the EVM measured at the i-th antenna connector.

4. The apparatus of claim 1, wherein the instructions are executable by the processor to cause the apparatus to set per-antenna EVM requirements equal to $EVM_{req}/\sqrt{N}$ where $EVM_{req}$ is a single antenna EVM requirement for a given modulation.

5. The apparatus of claim 1, wherein the EVM for the antenna port is given by:

$$EVM_{port} = \min(EVM_1, EVM_2, \ldots, EVM_N)$$

in response to the covariance matrix $\Sigma'$ being unknown.

6. The apparatus of claim 5, wherein the number of antenna connectors is at least two.

7. The apparatus of claim 6, wherein the EVM for the antenna port is given by:

$$EVM_{port} = \min(EVM_1, EVM_2)$$

in response to the number of antennas being two and the correlation matrix $\Sigma$ of the transmitter noise being unknown.

8. The apparatus of claim 1, wherein the transmitter comprises a User Equipment transmitter for transmitting uplink signals to a base station, the method further comprising defining a noise floor of the base station due to transmitter noise using the calculated EVM.

9. A method, comprising:
receiving, using an unbiased linear minimum mean square error ("MMSE") equalizer, a transmission signal transmitted via a propagation channel, the signal generated and transmitted using an antenna port at a transmitter, the antenna port comprising a plurality of antennas (N) and an antenna connector for each of the plurality of antennas; and
determining an error vector magnitude ("EVM") for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix of the transmitter noise with dimension N×N and is given by $\Sigma' = \langle n'^H n' \rangle$.

10. The method of claim 9, wherein, in response to a correlation coefficient of the transmitter noise being unknown, the correlation coefficient is bounded by $\rho_{max}$ such that $0 \le \rho < \rho_{max}$ and the antenna port EVM is bounded by:

$$EVM_{port,wc}(\rho_{max}) = \begin{cases} \min(EVM_1, EVM_2) \sqrt{\dfrac{1-\rho_{max}^2}{1+\beta^2 - 2\rho_{max}\beta}} & \rho_{max} \le \beta \\ \min(EVM_1, EVM_2) & \rho_{max} > \beta \end{cases}$$

where $$\rho = \frac{|E(n'_1 n'^*_2)|}{\sqrt{E(|n'_1|^2)(|n'_2|^2)}} = \frac{|E(n'_1 n'^*_2)|}{EVM_1 EVM_2},$$

$$\beta = \frac{\min(EVM_1, EVM_2)}{\max(EVM_1, EVM_2)}$$

$$\sqrt{\frac{1-\rho_{max}^2}{1+\beta^2 - 2\rho_{max}\beta}} \le 1$$

and $EVM_i$ for $1 \le i \le N$ denotes the EVM measured at the i-th antenna connector.

11. The method of claim 9, wherein, in response to transmitter noise n at the N antenna connectors being independent such that the covariance matrix $\Sigma = \langle n^H n \rangle$ is diagonal, the EVM for the antenna port is given by:

$$EVM_{port} = \left(\frac{\sum_{i=1}^{N} \prod_{j=1, j \ne i}^{N} EVM_j^2}{\sum_{i=1}^{N} EVM_i^2}\right)^{\frac{1}{2}}$$

where the covariance matrix $\Sigma'$ is diagonal and $EVM_i$ for $1 \le i \le N$ denotes the EVM measured at the i-th antenna connector.

12. The method of claim 9, further comprising setting per-antenna EVM requirements equal to $EVM_{req}/\sqrt{N}$ where $EVM_{req}$ is a single antenna EVM requirement for a given modulation.

13. The method of claim 9, wherein the EVM for the antenna port is given by:

$$EVM_{port} = \min(EVM_1, EVM_2, \ldots, EVM_N)$$

in response to the covariance matrix $\Sigma'$ being unknown.

14. The method of claim 13, wherein the EVM for the antenna port is given by:

$$EVM_{port} = \min(EVM_1, EVM_2)$$

in response to the number of antennas being two and the correlation matrix $\Sigma$ of the transmitter noise being unknown.

15. A system, comprising:
a transmitting device that:
  generates a transmission signal; and
  transmits the transmission via a propagation channel using a transmitter, the transmitter comprising an antenna port comprising a plurality of antennas (N) and an antenna connector for each of the plurality of antennas; and
an evaluation device that:
  receives, using an unbiased linear minimum mean square error ("MMSE") equalizer, the transmission signal; and
  calculates an error vector magnitude ("EVM") for the antenna port of the transmitter based on an output of the unbiased linear MMSE equalizer, the EVM for the antenna port defined as:

$$EVM_{port} = 100 \cdot \left(1_{1 \times N} \Sigma'^{-1} 1_{N \times 1}\right)^{-\frac{1}{2}}$$

where $\Sigma'$ is a covariance matrix with dimension N×N and is given by $\Sigma' = \langle n'^H n' \rangle$.

16. The method of claim 13, wherein the number of antenna connectors is at least two.

17. The method of claim 9, wherein the transmitter comprises a User Equipment transmitter for transmitting uplink signals to a base station, the method further comprising defining a noise floor of the base station due to transmitter noise using the calculated EVM.

18. The system of claim 15, wherein, in response to a correlation coefficient of the transmitter noise being unknown, the correlation coefficient is bounded by $\rho_{max}$ such that $0 \le \rho < \rho_{max}$ and the antenna port EVM is bounded by:

$$EVM_{port,wc}(\rho_{max}) = \begin{cases} \min(EVM_1, EVM_2) \sqrt{\dfrac{1-\rho_{max}^2}{1+\beta^2 - 2\rho_{max}\beta}} & \rho_{max} \le \beta \\ \min(EVM_1, EVM_2) & \rho_{max} > \beta \end{cases}$$

where $$\rho = \frac{|E(n'_1 n'^*_2)|}{\sqrt{E(|n'_1|^2)(|n'_2|^2)}} = \frac{|E(n'_1 n'^*_2)|}{EVM_1 EVM_2},$$

$$\beta = \frac{\min(EVM_1, EVM_2)}{\max(EVM_1, EVM_2)}$$

-continued $$\sqrt{\frac{1-\rho_{max}^2}{1+\beta^2-2\rho_{max}\beta}} \leq 1.$$

and $EVM_i$ for $1 \leq i \leq N$ denotes the EVM measured at the i-th antenna connector.

19. The system of claim 15, wherein, in response to transmitter noise n at the N antenna connectors being independent such that the covariance matrix $\Sigma = \langle n^H n \rangle$ is diagonal, the EVM for the antenna port is given by:

$$EVM_{port} = \left( \frac{\prod_{i=1}^{N} EVM_i^2}{\sum_{i=1}^{N} \prod_{j=1, j \neq i}^{N} EVM_j^2} \right)^{\frac{1}{2}}$$

where the covariance matrix $\Sigma'$ is diagonal and $EVM_i$ for $1 \leq i \leq N$ denotes the EVM measured at the i-th antenna connector.

20. The system of claim 15, wherein the evaluation device sets per-antenna EVM requirements equal to $EVM_{req}/\sqrt{N}$ where $EVM_{req}$ is a single antenna EVM requirement for a given modulation.

* * * * *